(12) United States Patent
Vakili

(10) Patent No.: US 10,855,453 B1
(45) Date of Patent: Dec. 1, 2020

(54) SYSTEMS AND METHODS FOR TIME-BIN QUANTUM SESSION AUTHENTICATION

(71) Applicant: Wells Fargo Bank, N.A., San Francisco, CA (US)

(72) Inventor: Masoud Vakili, Los Altos, CA (US)

(73) Assignee: WELLS FARGO BANK, N.A., San Francisco, CA (US)

(*) Notice: Subject to any disclaimer, the term of this patent is extended or adjusted under 35 U.S.C. 154(b) by 75 days.

(21) Appl. No.: 16/105,124

(22) Filed: Aug. 20, 2018

(51) Int. Cl.
| | |
|---|---|
| *H04L 29/06* | (2006.01) |
| *H04L 9/08* | (2006.01) |
| *H04B 10/079* | (2013.01) |
| *H04B 10/70* | (2013.01) |

(52) U.S. Cl.
CPC ....... *H04L 9/0844* (2013.01); *H04B 10/0795* (2013.01); *H04B 10/70* (2013.01); *H04L 9/0852* (2013.01)

(58) Field of Classification Search
None
See application file for complete search history.

(56) References Cited

U.S. PATENT DOCUMENTS

| | | | |
|---|---|---|---|
| 5,515,438 A | * 5/1996 | Bennett | H04L 9/0858 380/256 |
| 7,324,647 B1 | 1/2008 | Elliott | |
| 7,333,611 B1 | 2/2008 | Yuen et al. | |
| 7,460,669 B2 | 12/2008 | Foden et al. | |
| 7,649,996 B2 | 1/2010 | Nishioka et al. | |
| 7,697,693 B1 | 4/2010 | Elliott | |
| 7,787,628 B2 | 8/2010 | Kuang et al. | |
| 8,332,730 B2 | 12/2012 | Harrison et al. | |
| 8,693,691 B2 | 4/2014 | Jacobs | |
| 8,755,525 B2 | 6/2014 | Wiseman | |
| 8,855,316 B2 | 10/2014 | Wiseman et al. | |
| 9,036,817 B1 | 5/2015 | Hunt et al. | |
| 9,083,684 B2 | 7/2015 | Tanizawa et al. | |

(Continued)

FOREIGN PATENT DOCUMENTS

| | | |
|---|---|---|
| CN | 107040378 A | 8/2017 |
| WO | 2017/108539 A1 | 6/2017 |

OTHER PUBLICATIONS

Price, Alasdair B. et al. High-Speed Quantum Key Distribution with Wavelength-Division Multiplexing on Integrated Photonic Devices. 2018 Conference on Lasers and Electro-Optics (CLEO). https://ieeexplore.ieee.org/stamp/stamp.jsp?tp=&arnumber=8426886 (Year: 2018).*

(Continued)

*Primary Examiner* — Jeremiah L Avery
(74) *Attorney, Agent, or Firm* — Alston & Bird LLP

(57) ABSTRACT

Systems, apparatuses, methods, and computer program products are disclosed for session authentication. An example method includes determining, by decoding circuitry, a set of optical path lengths to use for measurement. The example method further includes receiving, by the decoding circuitry, a set of time-bin qubits. The example method further includes measuring, by the decoding circuitry and based on the determined set of optical path lengths, the set of time-bin qubits to generate a measured set of time-bin qubits. The example method further includes generating, by session authentication circuitry, a session key based on the measured set of time-bin qubits.

20 Claims, 14 Drawing Sheets

(56) References Cited

U.S. PATENT DOCUMENTS

| | | | |
|---|---|---|---|
| 9,184,912 | B2 | 11/2015 | Harrington |
| 9,191,198 | B2 | 11/2015 | Harrison et al. |
| 9,680,640 | B2 | 6/2017 | Hughes et al. |
| 9,692,595 | B2 | 6/2017 | Lowans et al. |
| 10,439,806 | B2 | 10/2019 | Fu et al. |
| 10,540,146 | B1 | 1/2020 | Vakili |
| 10,587,402 | B2* | 3/2020 | Nordholt .............. H04B 10/508 |
| 2004/0109564 | A1 | 6/2004 | Cerf et al. |
| 2004/0238813 | A1 | 12/2004 | Lidar et al. |
| 2005/0036624 | A1 | 2/2005 | Kent et al. |
| 2005/0249352 | A1 | 11/2005 | Choi et al. |
| 2006/0056630 | A1* | 3/2006 | Zimmer ................. G06N 10/00 380/256 |
| 2006/0263096 | A1 | 11/2006 | Dinu et al. |
| 2007/0260658 | A1 | 11/2007 | Fiorentino et al. |
| 2008/0076525 | A1 | 3/2008 | Kim |
| 2009/0180615 | A1 | 7/2009 | Trifonov |
| 2011/0126011 | A1 | 5/2011 | Choi et al. |
| 2011/0173696 | A1 | 7/2011 | Dynes et al. |
| 2011/0213979 | A1 | 9/2011 | Wiseman et al. |
| 2013/0083926 | A1 | 4/2013 | Hughes et al. |
| 2013/0101119 | A1 | 4/2013 | Nordholt et al. |
| 2013/0101121 | A1 | 4/2013 | Nordholt et al. |
| 2013/0163759 | A1 | 6/2013 | Harrison et al. |
| 2013/0251145 | A1* | 9/2013 | Lowans ................ H04L 9/0858 380/44 |
| 2013/0315395 | A1 | 11/2013 | Jacobs |
| 2015/0188701 | A1 | 7/2015 | Nordholt et al. |
| 2015/0222619 | A1 | 8/2015 | Hughes et al. |
| 2016/0028542 | A1 | 1/2016 | Choi et al. |
| 2016/0248586 | A1 | 8/2016 | Hughes et al. |
| 2016/0328211 | A1 | 11/2016 | Nordholt et al. |
| 2016/0352515 | A1 | 12/2016 | Bunandar et al. |
| 2017/0126654 | A1 | 5/2017 | Fu |
| 2017/0214525 | A1 | 7/2017 | Zhao et al. |
| 2017/0222731 | A1 | 8/2017 | Lucamarini et al. |
| 2017/0324551 | A1 | 11/2017 | Ahn |
| 2017/0324552 | A1 | 11/2017 | Ahn |
| 2017/0331623 | A1 | 11/2017 | Fu et al. |
| 2017/0338951 | A1 | 11/2017 | Fu et al. |
| 2017/0338952 | A1 | 11/2017 | Hong et al. |
| 2018/0069698 | A1 | 3/2018 | Hong et al. |
| 2018/0198608 | A1 | 7/2018 | Nordholt et al. |
| 2018/0269989 | A1 | 9/2018 | Murakami et al. |
| 2019/0007215 | A1 | 1/2019 | Hakuta et al. |
| 2019/0020469 | A1 | 1/2019 | Dottax et al. |
| 2019/0129694 | A1 | 5/2019 | Benton et al. |
| 2019/0238326 | A1 | 8/2019 | Ji et al. |
| 2019/0243611 | A1 | 8/2019 | Martin et al. |
| 2019/0268146 | A1 | 8/2019 | Samid |
| 2019/0289006 | A1 | 9/2019 | Fang et al. |
| 2020/0153619 | A1 | 5/2020 | Ribordy |

OTHER PUBLICATIONS

Garcia-Escartin, Juan Carlos; Chamorro-Posada, Pedro. Hidden Probe Attacks on Ultralong Fiber Laser Key Distribution Systems. IEEE Journal of Selected Topics in Quantum Electronics (vol. 24 , Issue: 3 , May-Jun. 2018). https://ieeexplore.ieee.org/stamp/stamp.jsp?tp=&arnumber=8219358 (Year: 2018).*

Imany, Poolad et al. Demonstration of frequency-bin entanglement in an integrated optical microresonator. 2017 Conference on Lasers and Electro-Optics (CLEO). https://ieeexplore.ieee.org/stamp/stamp.jsp?tp=&arnumber=8083593 (Year: 2017).*

Chen, Wei et al. Field Experiment on a "Star Type" Metropolitan Quantum Key Distribution Network, IEEE Photonics Technology Letters, vol. 21, Issue: 9. https://ieeexplore.ieee.org/stamp/stamp.jsp?tp=&arnumber=4787043 (Year: 2009).*

Bienfang, J.C. et al. Quantum generated one-time-pad encryption with 1.25 Gbps clock synchronization. 2005 OFC/NFOEC Technical Digest. Optical Fiber Communication Conference. http://ieeexplore.ieee.org/stamp/stamp.jsp?tp=&arnumber=1501276 (Year: 2005).*

Sirdhar, S. et al., Intelligent Security Framework for IoT Devices Cryptography based End-To-End security Architecture, International Conference on Inventive Systems and Control (ICISC—2017) 1-5.

Mohammad, Omer K. et al., Statistical Analysis for Random Bits Generation on Quantum Key Distribution, Cyber Warfare and Digital Forensic (CyberSec), 2014 Third International Conference (2014) 45-51.

Liu, D. et al., A Communication Model in Multilevel Security Network Using Quantum Key, Chinese Automation Congress (CAC) (2015) 915-918.

Hong, K. W. et al., Challenges in Quantum Key Distribution: A Review, ACM Proceeding (2016) 29-33.

Debuisschert, T. et al., Strenghtening Classical Symmetric Encryption with Continuous Variable Quantum Key Distribution, CLEO Technical Digest, OSA (2012), 2 pages.

Abubakar, M. Y. et al., Two Channel Quantum Security Modelling Focusing on Quantum Key Distribution Technique, IT Convergence and Security (ICITCS), 2015 5th International Conference (2015) 5 pages.

Non-Final Office Action dated Jan. 16, 2020 for U.S. Appl. No. 16/712,338.

Charjan, S. et al., "Quantum Key Distribution by Exploitation Public Key Cryptography (ECC) In Resource Constrained Devices," International Journal of Emerging Engineering Research and Technology, 3(7): 5-12, (2015).

Non-Final Rejection for U.S. Appl. No. 15/916,763, dated Oct. 30, 2019.

Non-Final Rejection for U.S. Appl. No. 16/105,294, dated Nov. 12, 2019.

Non-Final Rejection for U.S. Appl. No. 16/105,370, dated Nov. 8, 2019.

Pandya, M., "Securing Clouds—The Quantum Way," arXiv preprint arXiv:1512.02196, 16 pages, (2015).

Armanuzzaman, Md. et al. A Secure and Efficient Data Transmission Technique Using Quantum Key Distribution. 2017 4th International Conference on Networking, Systems and Security (NSysS). https://ieeexplore.ieee.org/stamp/stamp.jsp?tp=&arnumber=8267797 (Year: 2017).

Liu, Zhihao et al. Mutually Authenticated Quantum Key Distribution Based on Entanglement Swapping. 2009 Pacific-Asia Conference on Circuits, Communications and Systems. https://ieeexplore.ieee.org/stamp/stamp.jsp?tp=&arnumber=5232366 (Year:2009).

Ronczka, John. Backchanneling Quantum Bit (Qubit)'Shuffling1: Quantum Bit (Qubit) 'Shuffling' as Added Security by Slipstreaming Q-Morse. 2016 3rd Asia-Pacific World Congress on Computer Science and Engineering (APWC on CSE). https://ieeexplore.ieee.org/stamp/stamp.jsp?tp=&arnumber=7941948 (Year: 2016).

Elboukhari, Mohamed et al. Implementation of secure key distribution based on quantum cryptography. 2009 International Conference on Multimedia Computing and Systems. https://ieeexplore.ieee.org/stamp/stamp.jsp?tp=&arnumber=5256673 (Year:2009).

Thangavel, T.S.; Krishnan, A. Performance of integrated quantum and classical cryptographic model for password authentication. https://ieeexplore.ieee.org/stamp/stamp.jsp?tp=&arnumber=5591718 (Year:2010).

* cited by examiner

| Time-Bin Qubit Encoder | Transmitted Set of Qubits | 1 | 1 | 0 | 0 | 0 | 1 | 1 | 0 |
|---|---|---|---|---|---|---|---|---|---|
| Time-Bin Qubit Decoder | Measured Set of Qubits | 1 | 0 | 0 | 0 | 0 | 0 | 1 | 0 |
| | Correctness | Correct | Error | Correct | Correct | Correct | Error | Correct | Correct |

| Time-Bin Qubit Encoder | Set of Qubits | 1 | 1 | 0 | 0 | 0 | 1 | 1 | 0 |
|---|---|---|---|---|---|---|---|---|---|
| First Time-Bin Qubit Decoder | First Measured Subset of Qubits | 1 | 0 | 0 | 0 | | | | |
| | Correctness | Correct | Error | Correct | Correct | | | | |
| Second Time-Bin Qubit Decoder | Second Measured Subset of Qubits | | | | | 0 | 0 | 1 | 0 |
| | Correctness | | | | | Correct | Error | Correct | Correct |

SYSTEMS AND METHODS FOR TIME-BIN QUANTUM SESSION AUTHENTICATION

TECHNOLOGICAL FIELD

Example embodiments of the present disclosure relate generally to session authentication and, more particularly, to systems and methods for quantum session authentication.

BACKGROUND

Session authentication may describe various techniques for securing electronic communications between two computing devices, such as a server device and a client device, using a unique session key (e.g., a session identifier (ID)). Selecting a session key that cannot be guessed is thus an important element of preventing attacks whereby a perpetrator derives the session key and then uses it to intercept communications by tapping into the communication path between the server device and the client device. This security concern is amplified in high volume session authentication systems designed to authenticate multiple sessions between multiple computing devices, such as multiple server devices and multiple client devices, at any given time.

Generating session IDs to be used in session authentication often relies upon the use of pseudo-random number generation. While often referred to as "random number generation," in truth it has historically been difficult to generate truly random numbers, and tools for "random" number generation have usually employed procedures whose outputs can be reproduced if certain underlying inputs are known. And while historically such pseudo-random number generation has been sufficient to generate session IDs that prevent malicious access, methods relying upon pseudo-random number generation are becoming increasingly susceptible to attack as the availability of computing power has increased. If a perpetrator has access to a user's device or information related to a user's session such as the user's access time, there are now often sufficient computing resources for a malicious attacker to perform a brute force attack exploiting the patterns inherent in traditional pseudo-random number generation techniques. In this way, a user's session may be compromised by an attacker who is able to replicate the user's session key. As alluded to above, this vulnerability has emerged by virtue of the new technical problems posed by the growing computing resources available today, because perpetrators have a greater ability to determine the method by which a session key is pseudo-randomly generated, replicate the method to generate the same session key, and then break into a user's session.

BRIEF SUMMARY

Systems, apparatuses, methods, and computer program products are disclosed herein for time-bin quantum session authentication. The session authentication system provided herein solves the above problems by generating and measuring time-bin quantum bits (qubits) using different Mach-Zehnder interferometers (MZIs) in order to inject true randomness into the process for generating session keys or seeds for a pseudorandom number generation process used to establish secure sessions at multiple session authentication system server devices.

In one example embodiment, a system is provided for session authentication. The system may comprise decoding circuitry configured to determine a set of optical path lengths to use for measurement. The decoding circuitry may be further configured to receive a set of time-bin qubits and measure, based on the determined set of optical path lengths, the set of time-bin qubits to generate a measured set of time-bin qubits. The system may further comprise session authentication circuitry configured to generate a session key based on the measured set of time-bin qubits.

In another example embodiment, an apparatus is provided for session authentication. The apparatus may comprise decoding circuitry configured to determine a set of optical path lengths to use for measurement. The decoding circuitry may be further configured to receive a set of time-bin qubits and measure, based on the determined set of optical path lengths, the set of time-bin qubits to generate a measured set of time-bin qubits. The apparatus may further comprise session authentication circuitry configured to generate a session key based on the measured set of time-bin qubits.

In another example embodiment, a method is provided for session authentication. The method may comprise determining, by decoding circuitry, a set of optical path lengths to use for measurement. The method may further comprise receiving, by the decoding circuitry, a set of time-bin qubits. The method may further comprise measuring, by the decoding circuitry and based on the determined set of optical path lengths, the set of time-bin qubits to generate a measured set of time-bin qubits. The method may further comprise generating, by session authentication circuitry, a session key based on the measured set of time-bin qubits.

In another example embodiment, a computer program product is provided for session authentication. The computer program product comprises at least one non-transitory computer-readable storage medium storing program instructions that, when executed, may cause an apparatus to determine a set of optical path lengths to use for measurement. The program instructions, when executed, may further cause the apparatus to receive a set of time-bin qubits. The program instructions, when executed, may further cause the apparatus to measure, based on the determined set of optical path lengths, the set of time-bin qubits to generate a measured set of time-bin qubits. The program instructions, when executed, may further cause the apparatus to generate a session key based on the measured set of time-bin qubits.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying drawings, which are not necessarily drawn to scale, illustrate embodiments and features of the present disclosure. Together with the specification, including the brief summary above and the detailed description below, the accompanying drawings serve to explain the embodiments and features of the present disclosure. The components illustrated in the drawings represent components that may or may not be present in various embodiments or features of the disclosure described herein. Accordingly, some embodiments or features of the present disclosure may

FIG. 3 illustrates example sets of time-bin qubits in accordance with some example embodiments described herein;

FIG. 4 illustrates example sets of time-bin qubits in accordance with some example embodiments described herein.

DETAILED DESCRIPTION

Figure 1A:
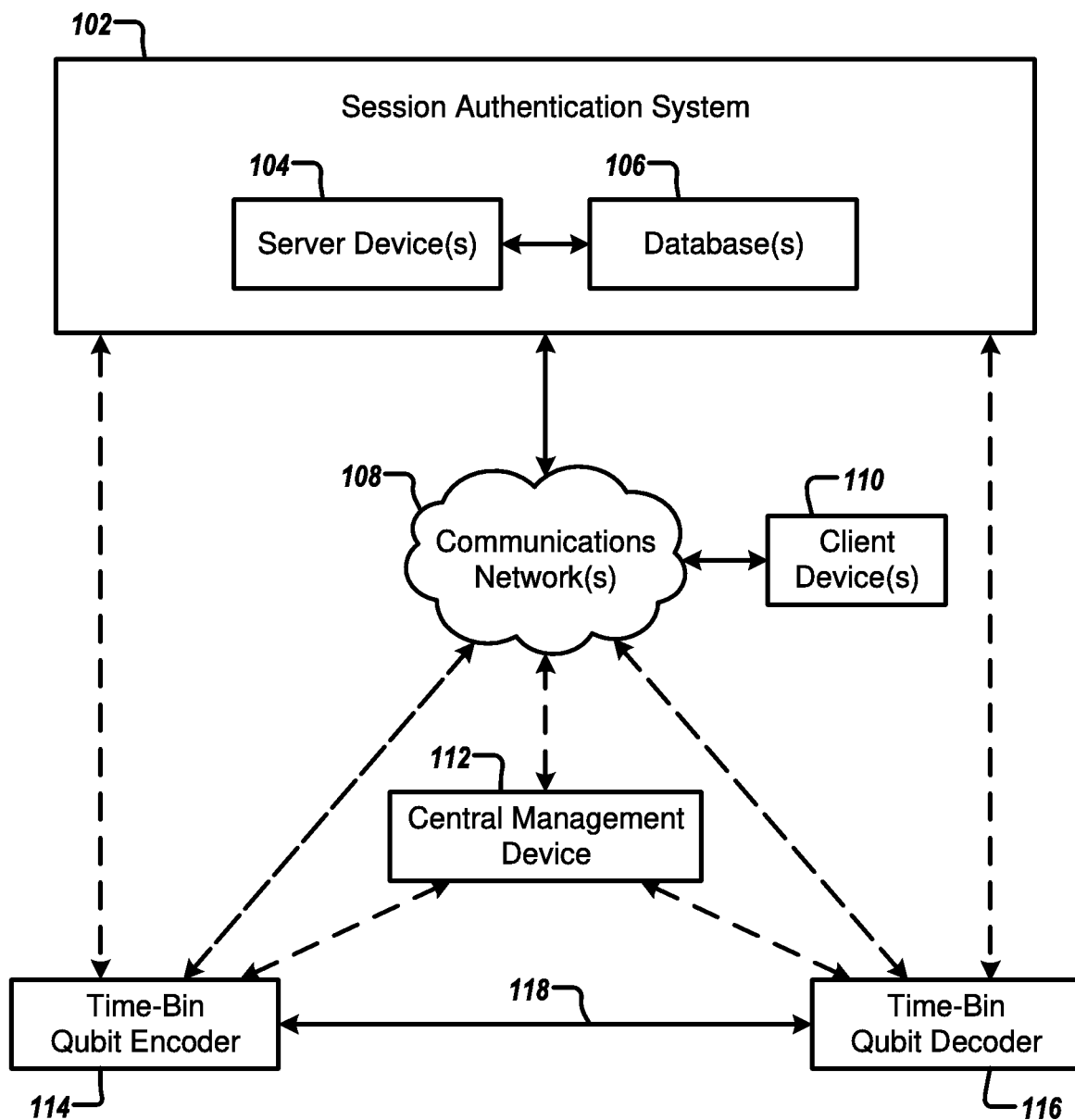
FIGS. 1A, 1B, 1C, 1D, and 1E illustrate system diagrams of sets of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for time-bin session authentication. Traditionally, it has been very difficult to select or generate a robust session key or ID (e.g., a unique number that is unlikely to be guessed or deciphered by a third party). In addition, there is typically no way to prove that the session ID is unattainable by a third party perpetrator. In an attempt to transmit session IDs that are unattainable by a perpetrator, quantum key distribution (QKD) systems have been developed. In general terms, QKD systems exchange keys between two parties in a secure way that cannot be guessed. For instance, a one-time-pad quantum key exchange is impenetrable because a potential perpetrator eavesdropping on the transmission of a set of time-bin qubits representing a key will necessarily induce errors in the set of time-bin qubits due to quantum uncertainty, alerting the two parties to the attempted eavesdropping.

In contrast to these conventional QKD systems for transmitting secret keys securely, the present disclosure relates to a mechanism for generating unique keys in the first place. To do this, a session authentication system encodes and decodes a set of quantum qubits (e.g., qubits) using Mach-Zehnder interferometry in order to generate a random number used to generate a session key or a random seed (e.g., a set of qubits that is randomized due to quantum effects such as the principle of quantum uncertainty) for pseudorandom number generation used to establish a secure session. A quantum bit or a qubit may be represented by any two-state quantum attribute. When a qubit is encoded into a time-bin qubit using a first MZI and measured using a second MZI having the same characteristics, the original time-bin qubit is recreated. Generation of time-bin qubits may be accomplished by determination and temperature-stabilization of the optical path lengths of the two optical paths. For example, the state |0> may be assigned to the first arriving wave and the state |1> to the later arriving wave such that the time-bin qubit encoder described herein may encode qubits based on the two states.

However, the nature of quantum uncertainty and the indeterminacy of quantum states establishes that decoding the time-bin qubit using a second MZI with characteristics that are different from the first MZI will generate a qubit that has some probability of being different than the original qubit. As such, by ensuring that different MZIs are used when encoding and decoding at least some of the set of time-bin qubits in a transmission, the session authentication system disclosed herein introduces random errors in the measured time-bin qubits based on quantum uncertainty and the indeterminacy of these quantum states. These random errors can then prevent the reproduction of session keys by malicious attackers.

The present disclosure thus provides improved session authentication techniques by encoding and decoding qubits using time-bin encoding and decoding in order to randomly generate a number that may be used to generate a session key or that may comprise a random seed for pseudorandom number generation used to establish a secure session. In one illustrative example, the present disclosure provides for encoding, by a single-photon laser device in conjunction with a first MZI, a sequence of bits that is then used to generate a set of time-bin qubits. Using decoherency of the time-bin quantum states, the decoded bins have inherent randomness. In some instances, the present disclosure provides for generating, by the qubit decoder (e.g., an MZI having different specifications than the MZI used to encode the time-bin qubits), a sequence of random bits will thus not match the encoded sequence of time-bin qubits, and which will thus introduce random errors in the set of decoded bits based on quantum uncertainty.

The present disclosure then provides for a session authentication system server device that uses the sequence of random bits as a random number to generate a session key or as a seed for pseudorandom number generation in session authentication. In some embodiments, the session authentication system server device generates a session ID that is truly random based on the generated random number. In some embodiments, the session authentication system server device uses this random number to generate a seed for pseudo-random number generation (PRNG) that is completely unknown.

According to the quantum indeterminacy of the states, each decoded time-bin qubit has a probability (e.g., a fifty percent chance) of measuring the time-bin qubit that was originally encoded. As a result, presuming that at least a portion of the time-bin qubit pattern generated by the time-bin qubit decoder is decoded with decoherency, the resulting set of time-bin qubits is inherently random and may be used as a random number for any purpose (e.g., as a session ID or a seed for PRNG). The random number cannot be reproduced by any perpetrator due to the probabilistic effects of quantum uncertainty, even if the perpetrator knows the original time-bin qubits that were transmitted.

In some embodiments, the present disclosure provides for a laser device that is connected to many servers through a network of PM fibers and PM switches. Each server may comprise integrated optical receiver circuitry to receive and measure time-bin qubits. In one example implementation, an all optical PM switch may connect the laser device to sixteen servers. The connection may be modulated with fast modulation of the PM switch going to one server at a time. The laser device may also be connected through multiple PM switches via PM fiber to support a larger number of servers. For example, a laser device may be coupled to 256 servers through two layers of 1×16 PM switches.

In one illustrative example, the laser device may generate qubits using the horizontal and vertical polarization states as one quantum basis and the two circular photon polarization states (which are linear combinations of the vertical and horizontal photon polarization states) as another quantum basis. These qubits are then sent from the laser device, through the PM switch, to a server. The server may have no network communication with the laser device and, as such, may not know the quantum basis or bases in which these qubits were encoded. Accordingly, the server may use its own quantum basis (e.g., a pseudo-random quantum basis) to measure these qubits. For example, the server might measure every photon in the quantum basis of vertical and horizontal polarization state. Each time the server uses the wrong quantum basis to measure the photon polarization state, the server has a probability (e.g., a fifty percent chance) of decoding the correct bit according to the quantum uncertainty principle. Accordingly, the time-bin qubit pattern that the server regenerates is inherently random and can be used as a session key. Alternatively the generated bit pattern could be used as a seed for PRNG.

In some embodiments, the MZIs included in the time-bin qubit encoder and the time-bin qubit decoder may be asymmetrical MZIs and decoherency could be introduced through means other than differences in optical path length or device characteristics, such as lack of temperature control or temperature gradients. In traditional QKD systems, the optical path from the encoder to the decoder must be stable and, in many cases, temperature controlled to prevent quantum decoherence of photon pulses. In contrast to these traditional systems, the present disclosure provides that the optical path from the encoder MZI (e.g., the first MZI included in the time-bin qubit encoder) to the decoder MZI (e.g., the second MZI included in the time-bin qubit decoder) may be unstable and not temperature controlled to enhance the quantum decoherence of photon pulses. These embodiments use decoherency as an advantage to improve randomness. Due to quantum decoherency, the qubit will be measured randomly at the decoder MZI, and thus, one will generate a different binary number. Even identical qubit sequences measured twice will result in the generation of two different binary numbers which are random in nature.

In some embodiments, the present disclosure provides for time-bin encoding using Mach-Zehnder interferometry to separate slightly two photons such that their times of flight until the time of arrival at the destination are, and remain, different. By scrambling the time of flight or the time of measurement, ambiguity may be introduced in the photon arrival times and provide for generation of a random number based on a random measurement of "1"s and "0"s. The random number may be used for session key generation and thereby secure a client-server session which could not be broken by any guessing algorithm or method due to true indeterminacy of quantum states. In some embodiments, the system may be placed on a monolithic chip.

In some embodiments, the present disclosure provides a system for session authentication using quantum line switching, the system comprising: encoding circuitry configured to generate a first set of time-bin qubits and transmit the set of time-bin qubits over a quantum line; decoding circuitry configured to receive the set of time-bin qubits and time-bin decode, based on a decoherent decoding apparatus or line of transfer, the set of time-bin qubits to generate a set of random bits; and session authentication circuitry configured to generate a session key based on the set of random bits. The decoherency could be caused by asymmetric MZIs (e.g., an MZI coder and an MZI decoder having decoherent path lengths).

There are many advantages of these and other embodiments described herein, such as: providing a session key that has truly random elements, and, as a result, facilitating the generation of a session key that cannot be reproduced by a third party. The session key or the seed generated in this way is inherently random and is unattainable to any perpetrator due to quantum uncertainty. The random number generation techniques disclosed herein obviate the traditional coherence length issue because decoherence does not harm, and actually helps, the process of randomizing the decoded qubits. Further, temperature control for path stabilization is not needed.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "quantum basis" refers to sets of orthogonal quantum states, such as pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state |0> and the vertical photon polarization state |1>. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state |L> and the right circular photon polarization state |R>.

The term "optical line" refers to an optical communications path. For example, an optical line may comprise an optical fiber, an optical waveguide, a fiber optic cable, a quantum line, or a combination thereof.

The term "quantum line" refers to a quantum communications path. For example, a quantum line may comprise a polarization-maintaining optical fiber (PMF or PM fiber), free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible.

The terms "time-bin qubit encoder" and "time-bin qubit decoder" are used herein to refer to any devices that respectively encode (e.g., generate) or decode (e.g., measure) a qubit in time-bins of information on a photon. In this regard, the time-bin qubit encoder and time-bin qubit decoder may comprise optoelectronic devices, such as MZIs, as described below.

The terms "optoelectronic device," "optoelectronic component," "laser device," "light source," "single photon source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector. In some embodiments, a first optoelectronic device may include a first MZI configured to generate time-bin qubits and transmit the generated time-bin qubits over an optical line, and a second optoelectronic device may include a second MZI configured to measure time-bin qubits received over the optical line.

The characteristics of the first MZI, such as optical path length, may be different from the characteristics of the second MZI such that the first MZI and the second MZI may be considered asymmetrical MZIs. Each of the MZIs disclosed herein may comprise a combination of mirrors, beam splitters, photodetectors fiberoptic cables, lenses, nonlinear crystals, wave plates, motors (e.g., servo motors), motion controllers, temperature controllers (e.g., thermoelectric devices), and any other suitable components arranged to perform the operations and functions disclosed herein, including, but not limited to, the controlling of optical path length.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more time-bin qubit encoders, time-bin qubit decoders, switching devices, PRNG generating devices, server devices, remote server devices, cloud-based server devices, cloud utilities, or other devices.

Figure 1B:
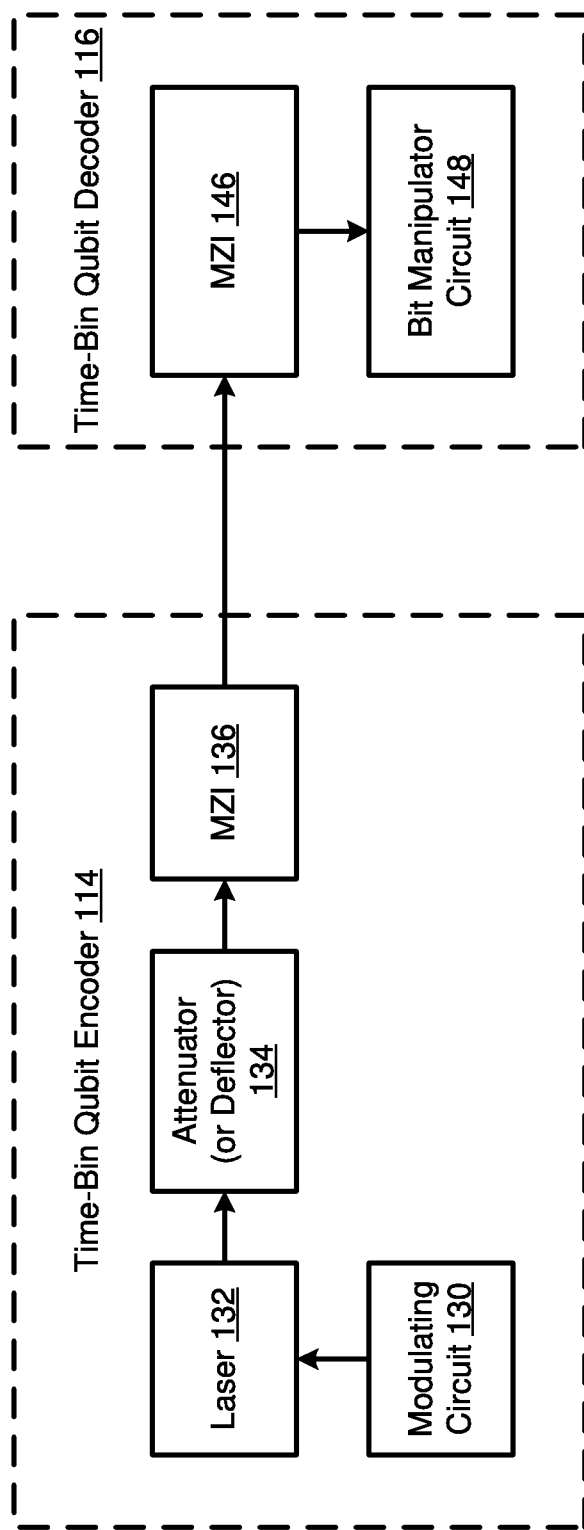
Figure 1C:
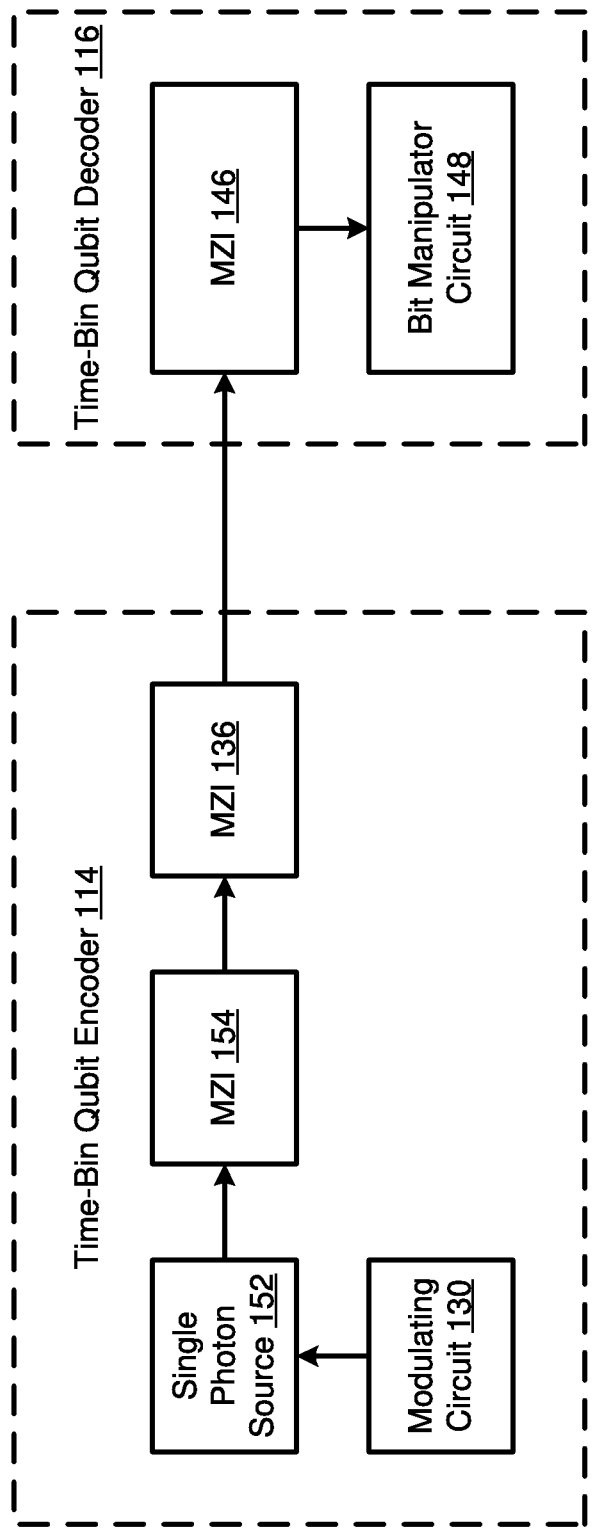
Figure 1D:
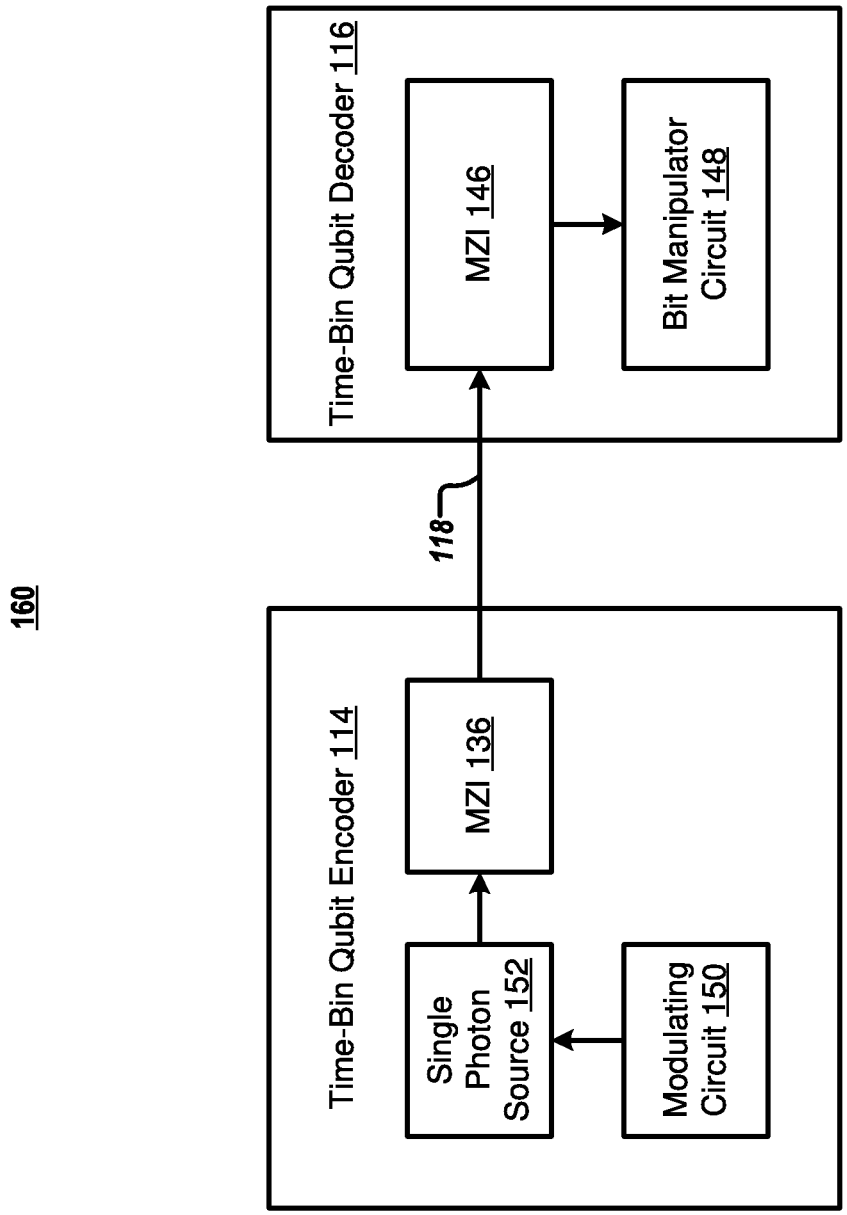
Figure 1E:
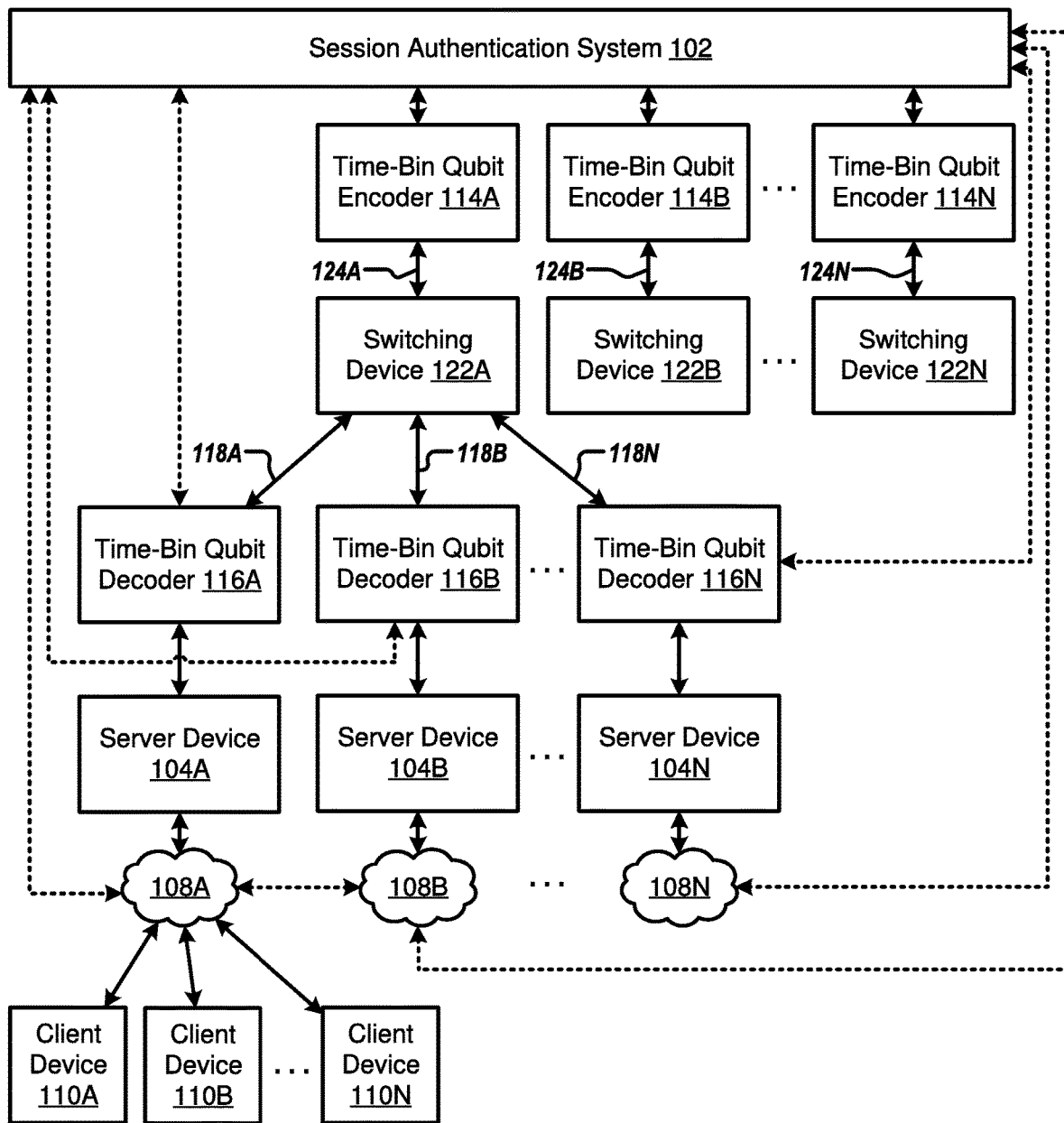

FIGS. 1A-1E illustrate system diagrams of sets of devices that may be involved in some example embodiments described herein. In this regard, FIG. 1A discloses an example environment 100 within which embodiments of the present disclosure may operate to authenticate sessions between devices. FIG. 1B discloses an alternative example environment 120 within which embodiments of the present disclosure may operate to authenticate sessions between devices. FIG. 1C discloses another alternative example environment 140 within which embodiments of the present disclosure may operate to authenticate sessions between devices. FIG. 1D discloses another alternative example environment 160 within which embodiments of the present disclosure may operate to authenticate sessions between devices. FIG. 1E discloses another alternative example environment 180 within which embodiments of the present disclosure may operate to authenticate sessions between devices.

As illustrated in FIGS. 1A-1E, a session authentication system 102 may include one or more session authentication system server devices 104 (e.g., 104A-104N) in communication with one or more session authentication system databases 106. The session authentication system 102 may be embodied as one or more computers or computing systems as described herein. The session authentication system 102 may be in communication with one or more client devices 110 (e.g., 110A-110N), central management device 112, one or more time-bin qubit encoders 114 (e.g., 114A-114N), one or more time-bin qubit decoders 116 (e.g., 116A-116N), or a combination thereof through one or more communications networks 108 (e.g., 108A-108N). One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof.

In some embodiments, the session authentication system 102 may generate session IDs for secure authentication of communication sessions between any of the one or more client devices 110 and one or more other devices (e.g., one or more session authentication system server devices 104, or one or more other devices not shown in FIGS. 1A-1E). To generate a particular session ID, the session authentication system 102 may invoke use of the central management device 112, one or more time-bin qubit encoders 114, and one or more time-bin qubit decoders 116, as described below.

The one or more session authentication system server devices 104 may be embodied as one or more servers, remote servers, cloud-based servers (e.g., cloud utilities), processors, or any other suitable server devices, or any combination thereof. The one or more session authentication system server devices 104 receive, process, generate, and transmit data, signals, and electronic information to facilitate the operations of the session authentication system 102. The one or more session authentication system server devices 104 may include, for example, session authentication system server device 104A, session authentication system server device 104B, through session authentication system server device 104N, where N represents an alphabetic, numeric, or alphanumeric identifier. For example, in some instances the one or more session authentication system server devices 104 may include over 100,000 session authentication system servers.

The one or more session authentication system databases 106 may be embodied as one or more data storage devices, such as a Network Attached Storage (NAS) device or devices, or as one or more separate databases or servers. The one or more session authentication system databases 106 may store information received, retrieved, accessed, and generated by the session authentication system 102 to facilitate the operations of the session authentication system 102. For example, the one or more session authentication system databases 106 may store control signals, electronic information indicative of one or more time-dependent quantum encoding schedules, time-dependent quantum decoding schedules, unit-dependent quantum encoding schedules, unit-dependent quantum decoding schedules, pseudo-random optical path length selection techniques, and combinations thereof. In another example, the one or more session authentication system databases 106 may store device characteristics (including, but not limited to, optical path lengths), and user account credentials for the central management device 112, one or more of the one or more time-bin qubit encoders 114, one or more of the one or more time-bin qubit decoders 116, or a combination thereof. In another example, the one or more session authentication system databases 106 may store device characteristics and user account credentials for one or more of the one or more client devices 110.

The one or more client devices 110 (e.g., 110A-110N) may be embodied by any computing device known in the art. Information received by the session authentication system 102 from the one or more client devices 110 may be provided in various forms and via various methods. For example, the one or more client devices 110 may be laptop computers, smartphones, netbooks, tablet computers, wearable devices, desktop computers, electronic workstations, automated transaction machines (ATMs), or the like, and the information may be provided to the session authentication system 102 through various modes of data transmission provided by these client devices. In some embodiments, the one or more client devices 110 may include or store various data and electronic information associated with one or more users. In some embodiments, the one or more client devices 110 may include, for example, client device 110A (e.g., a smartphone), client device 110B (e.g., a laptop computer), through client device 110N (e.g., an ATM), where N represents an alphabetic, numeric, or alphanumeric identifier. For example, in some instances the one or more client devices 110A-110N may include over 1,000,000 client devices, and the session authentication system 102 may authenticate over 1,000,000 sessions per hour.

In embodiments where a client device 110 is a mobile device, such as a smartphone or tablet, the mobile device may execute an "app" (e.g., a thin-client application) to interact with the session authentication system 102, one or more session authentication system server devices 104, or a combination thereof. In some embodiments, the mobile device may comprise a mobile operating system that provides for improved communication interfaces for interacting with external devices. Communication with hardware and software modules executing outside of the app may be provided via APIs provided by the mobile device operating system.

The central management device 112 may be embodied as one or more computers or computing systems as known in the art. For instance, the central management device 112 may be embodied as one or more servers, remote servers, cloud-based servers (e.g., cloud utilities), processors, or any other suitable server devices, or any combination thereof. In some embodiments, the central management device 112 may include or store various data and electronic information. For example, the central management device 112 may store control signals, electronic information indicative of one or more optical path lengths, time-dependent quantum encoding schedules, time-dependent quantum decoding schedules, unit-dependent quantum encoding schedules, unit-dependent quantum decoding schedules, pseudo-random optical path length selection techniques, and combinations thereof. In another example, the central management device 112 may store one or more databases, tables, or maps of optical path lengths; links or pointers to one or more optical path lengths contained therein; and combinations thereof. In another example, the central management device 112 may store device characteristics, and user account credentials for the central management device 112, one or more of the one or more time-bin qubit encoders 114, one or more of the one or more time-bin qubit decoders 116, or a combination thereof. In another example, the central management device 112 may store device characteristics and user account credentials for one or more of the one or more client devices 110.

In some embodiments, the central management device 112 may be configurable by a user using a computing device. For example, the user may use the computing device to control how the central management device 112 determines the various optical path lengths and schedules described herein. For example, the user may use the computing device to increase or decrease the complexity of the optical path length determination process used by the central management device 112. In one illustrative example, the user may use the computing device to instruct the central management device 112 to utilize a first optical path length determination process (e.g., that increases the variance in the optical path length in the time-bin qubit encoder 114, the time-bin qubit decoder, or both; or that decreases the optical path length below the coherence length in the time-bin qubit encoder 114, the time-bin qubit decoder 116, or both) when client device 110A requires a highly secure session, such as when client device 110A is accessing a financial website or when client device 110A is associated a geolocation requiring higher security. In another illustrative example, the user may use the computing device to instruct the central management device 112 to utilize a second optical path length determination process (e.g., that decreases the variance in the optical path length in the time-bin qubit encoder 114, the time-bin qubit decoder, or both; or that increases the optical path length above the coherence length in the time-bin qubit encoder 114, the time-bin qubit decoder 116, or both) when client device 110B requires less secure session, such as when client device 110B is accessing a content browsing website.

In some embodiments, the central management device 112 may be connected the session authentication system 102 either directly or via one or more communications networks 108. In some embodiments (not shown), the central management device 112 may be a component of the session authentication system 102. However, in other embodiments, the central management device 112 is not a part of or connected, directly or indirectly, to the session authentication system 102 in order to prevent communication of information regarding the quantum encoding or decoding procedures outlined herein between the central management device 112 and the session authentication system 102. The central management device 112 may include one or more databases (not shown for brevity) storing sets of optical path lengths, control signals, device characteristics, and user account credentials for one or more of the one or more time-bin qubit encoders 114, one or more of the one or more time-bin qubit decoders 116, or a combination thereof.

The central management device 112 may be connected to one or more time-bin qubit encoders 114 (e.g., 114A-114N). In various embodiments, one or more of these connections may be through the one or more communications networks 108. In other embodiments, one or more of these connections may be a direct connection through a non-network communications path (e.g., a direct wired or wireless communications path). In some embodiments, the time-bin qubit encoder 114 may be a component of the central management device 112, rather than a separate device, although it is illustrated as a separate device in FIGS. 1A-1E for ease of explanation. Time-bin qubit encoder 114, in turn, is connected to one or more time-bin qubit decoders 116 (e.g., 116A-116N) through one or more quantum lines 118 (e.g., 118A-118N). In some embodiments, the one or more quantum lines 118 may comprise one or more non-polarization maintaining optical fibers to introduce additional error (e.g., to scramble the qubits transmitted through the fiber). The one or more time-bin qubit decoders 116, in turn, may be connected to session authentication system 102. In various embodiments, one or more of these connections may be through the one or more communications networks 108. In other embodiments, one or more of these connections may be a direct connection through a non-network communications path (e.g., a direct wired or wireless communications path). In some embodiments, the time-bin qubit decoder 116 may be a component of the of the central management device 112 rather than a separate device, although it is illustrated as a separate device in FIGS. 1A-1E for ease of explanation. In some embodiments, the operations and functionality described herein with reference to central management device 112 may be performed instead by session authentication system 102, time-bin qubit encoder 114, time-bin qubit decoder 116, or a combination thereof.

Each of the one or more time-bin qubit encoders 114 may be embodied by any suitable time-bin qubit encoder, such as an optoelectronic device (e.g., a PLM; a laser device). In some embodiments, the time-bin qubit encoder 114 may comprise a first MZI and a modulating circuit. In some embodiments, the time-bin qubit encoder 114 may include or store various data and electronic information. For example, the time-bin qubit encoder 114 may include or store one or more control signals, electronic information indicative of one or more optical path lengths, time-dependent quantum encoding schedules, unit-dependent quantum encoding schedules, pseudo-random optical path length selection techniques, or any combination thereof. Alternatively, some or all of this information may be stored in the central management device 112, the session authentication system 102, or a combination of the central management device 112 and the session authentication system 102. In some embodiments, the time-bin qubit encoder 114 may include programmable firmware for receiving control signals and electronic instructions. In some embodiments, the time-bin qubit encoder 114 may be configured to generate a set of time-bin qubits. The time-bin qubit encoder 114 may be further configured to transmit the set of time-bin qubits to the time-bin qubit decoder 116 over a quantum line 118. In some embodiments, the one or more time-bin qubit encoders 114 may include, for example, time-bin qubit encoder 114A, time-bin qubit encoder 114B, through time-bin qubit encoder 114N, where N represents an alphabetic, numeric, or alphanumeric identifier. For example, in some instances the one or more time-bin qubit encoders 114A-114N may include over 100,000 time-bin qubit encoders.

In some embodiments, the time-bin qubit encoder 114 may be a cloud-based centralized time-bin qubit encoder that does not encode the time-bin qubits. Rather, the time-bin qubit encoder 114 may transmit pulses of single photons to one or more time-bin qubit decoders 116. A time-bin qubit decoder 116 may receive the pulses of single photons and use any (e.g., arbitrary) optical path length to measure the polarization of the photon pulses and measure time-bin qubits. Since the received photons are not polarized, the polarization measurement at the time-bin qubit decoder 116 results in completely random measured qubits even if the time-bin qubit decoder 116 uses only one optical path length to measure all the time-bin qubits.

Each of the one or more time-bin qubit decoders 116 may be embodied by any suitable time-bin qubit decoder, such as an optoelectronic device (e.g., a PLD). In some embodiments, the time-bin qubit decoder 116 may include or store various data and electronic information. For example, the time-bin qubit decoder 116 may include or store one or more control signals, electronic information indicative of one or more optical path lengths, time-dependent quantum decoding schedules, unit-dependent quantum decoding schedules, pseudo-random optical path length selection techniques, or any combination thereof. Alternatively, some or all of this information may be stored in the central management device 112, the session authentication system 102, or a combination of the central management device 112 and the session authentication system 102. The time-bin qubit decoder 116 is communicatively coupled to the time-bin qubit encoder 114 by the quantum line 118 and is configured to receive a set of time-bin qubits from the time-bin qubit encoder 114 over the quantum line 118. In some embodiments, the time-bin qubit encoder 114 may comprise a second MZI and a bit manipulation circuit. In some embodiments, the one or more time-bin qubit decoders 116 may include, for example, time-bin qubit decoder 116A, time-bin qubit decoder 116B, through time-bin qubit decoder 116N, where N represents an alphabetic, numeric, or alphanumeric identifier. For example, in some instances the one or more time-bin qubit decoders 116A-116N may include over 100,000 time-bin qubit decoders.

The time-bin qubit decoder 116 may be further configured to measure the received set of time-bin qubits based on a second optical path length different from the first optical path length used to encode the set of time-bin qubits. The second optical path length may be different from the first optical path length based on a various factors. In some instances, the second optical path length may be different from the first optical path length based on the physical lengths of the two optical paths (e.g., the first optical path may be longer than the second optical path, or vice versa). For example, the first optical path length may comprise a first physical length (e.g., 2.0 micrometers (microns)) of a first optical path in a first MZI of the time-bin qubit encoder 114, the second optical path may comprise a second physical length (e.g., 2.5 microns) of a second optical path in a second MZI of the time-bin qubit decoder 116, and the first physical length and the second physical length may be different. In some instances, the second optical path length may be different from the first optical path length based on the temperatures of the two optical paths (e.g., the first optical path may be at a higher temperature than the second optical path, or vice versa), such as when there is a temperature gradient between the first MZI of the time-bin qubit encoder 114 and the second MZI of the time-bin qubit decoder 116. For example, the first optical path length may comprise a first temperature (e.g., 60 degrees Fahrenheit) of a first optical path in the first MZI of the time-bin qubit encoder 114, the second optical path may comprise a second temperature (e.g., 50 degrees Fahrenheit) of a second optical path in the second MZI of the time-bin qubit decoder 116, and the first temperature and the second temperature may be different. In some instances, the second optical path length may be different from the first optical path length based on the media of the two optical paths (e.g., the first optical path may include a portion having a higher refractive index than the corresponding portion of the second optical path, or vice versa). For example, the first optical path length may comprise a first portion of a first optical path in the first MZI of the time-bin qubit encoder 114 comprising a first index of refraction (e.g., n=1.0), the second optical path length may comprise a second portion of a second optical path in the second MZI of the time-bin qubit decoder 116 comprising a second index of refraction (e.g., n=1.1), and the first index of refraction and the second index of refraction may be different. In some instances, the second optical path length may be different from the first optical path length based on the optical components included in the two optical paths (e.g., the first optical path but not the second optical path may comprise a phase shifter, or vice versa). In some instances, the optical path length difference may be shorter than the coherence length to mix up the time of arrival measurement and thereby increase the randomness of the decoded states.

The measured set of qubits will thus include a random component insofar as at least one time-bin qubit has been encoded with a first optical path length and was then measured using a second optical path length different from the first optical path length. When this divergence of optical path length occurs for multiple time-bin qubits, the measured set of qubits may comprise a plurality of wildcard time-bin qubits due to the effect of quantum uncertainty introduced into the system by the premeditated use of divergent optical path lengths for encoding and decoding of the set of time-bin qubits. As discussed in further detail with respect to FIGS. 3 and 4, each wildcard time-bin qubit has some probability of being an error time-bin qubit based on quantum uncertainty. In some embodiments, the first optical path length is not known or received by the time-bin qubit decoder 116. In some embodiments, the second optical path length is not known or received by the time-bin qubit encoder 114.

In one example embodiment, as shown in FIG. 1B, the time-bin qubit encoder 114 may comprise a modulating circuit 130, a laser 132, an attenuator (or deflector) 134, and an MZI 136. In some embodiments, modulating circuit 130 may be configured to modulate the laser 132, and laser 132 may be configured to produce pulses of photons. The laser 132 may be coupled to an attenuator (or deflector) 134 to reduce the intensity of the photon pulses to about one photon per pulse. The time-bin qubit decoder 116 may comprise an MZI 146 and a bit manipulator circuit 148. In some embodiments, the device characteristics (e.g., optical path length) of MZI 146 may be different from MZI 136. For example, the MZI 136 and the MZI 146 could be used as incompatible interferometers to generate random, measured time-bin qubits. In some embodiments, the components shown in environment 120 may be comprised by a single, on-chip MZI random bit generator.

In another example embodiment, as shown in FIG. 1C, the time-bin qubit encoder 114 may comprise a modulating circuit 130, a single photon source 152, an MZI 154, and an MZI 136. In some embodiments, modulating circuit 130 may be configured to modulate the single photon source 152, and the single photon source 152 may be configured to produce pulses of single photons. In this example embodiment, the single photon source 152 performs substantially the same function as the combination of laser 132 and attenuator (or deflector) 134 of the embodiment shown in FIG. 1B. The time-bin qubit decoder 116 may comprise an MZI 146 and a bit manipulator circuit 148. In some embodiments, the device characteristics (e.g., optical path length) of MZI 146 may be different from MZI 136, MZI 154, or both. For example, the MZI 136 and the MZI 146 could be used as incompatible interferometers to generate random, measured time-bin qubits. In some embodiments, the components shown in environment 140 may be comprised by a single, on-chip MZI random bit generator.

In yet another example embodiment, as shown in FIG. 1D, the time-bin qubit encoder 114 may comprise a modulating circuit 130, a single photon source 152, and an MZI 136. In some embodiments, modulating circuit 130 may be configured to modulate the single photon source 152, and the single photon source 152 may be configured to produce pulses of single photons. In this example embodiment, the single photon source 152 performs substantially the same function as the combination of laser 132 and attenuator (or deflector) 134 of the embodiment shown in FIG. 1B. The time-bin qubit encoder 114 may be optically coupled to the time-bin qubit decoder 116 through a quantum line 118 (e.g., a PM fiber; or, to increase randomness, a non-polarization maintaining optical fiber). The time-bin qubit decoder 116 may comprise an MZI 146 and a bit manipulator circuit 148. In some embodiments, the device characteristics (e.g., optical path length) of MZI 146 may be different from MZI 136. For example, the MZI 136 and the MZI 146 could be used as incompatible interferometers to generate random, measured time-bin qubits. In some embodiments, the components shown in environment 160 may provide for time-bin random number generation as a service.

Turning to FIG. 1E, in some embodiments each time-bin qubit encoder 114 may be communicatively coupled to a plurality of time-bin qubit decoders 116. For example, time-bin qubit encoder 114A may be communicatively coupled to time-bin qubit decoder 116A through quantum line 118A; time-bin qubit encoder 114A may be communicatively coupled to time-bin qubit decoder 116B through quantum line 118B; and time-bin qubit encoder 114A may be communicatively coupled to time-bin qubit decoder 116N through quantum line 118N. The one or more time-bin qubit decoders 116A-116N are, in turn, communicatively coupled to one or more session authentication system server devices 104A-104N. Each session authentication system server device 104A-104N may be in communication with one or more client devices 110A-110N through one or more communications networks 108A-108N, one or more non-network communications paths, or a combination thereof. Each session authentication system server device 104A-104N may generate session IDs based on data received from corresponding time-bin qubit decoders 116A-116N to facilitate secure authentication of communication sessions between the corresponding session authentication system server devices 104A-104N and one or more client devices communicatively coupled to one or more communications networks 108A-108N as described in further detail herein. For example, session authentication system server device 104A may generate session IDs based on data received from corresponding time-bin qubit decoder 116A to facilitate secure authentication of communication sessions between the session authentication system server device 104A and the one or more client devices 110A-110N communicatively coupled to one or more communications networks 108A. In another example, session authentication system server device 104B may generate session IDs based on data received from corresponding time-bin qubit decoder 116B to facilitate secure authentication of communication sessions between the session authentication system server device 104B and one or more client devices communicatively coupled to one or more communications networks 108B. In another example, session authentication system server device 104N may generate session IDs based on data received from corresponding time-bin qubit decoder 116N to facilitate secure authentication of communication sessions between the session authentication system server device 104N and one or more client devices communicatively coupled to one or more communications networks 108N.

In some embodiments, the time-bin qubit encoder 114A may be a cloud-based centralized time-bin qubit encoder configured to generate a set of time-bin qubits using an MZI and transmit (e.g., over one or more quantum lines 118A-118N; over one or more quantum lines 124A-124N to one or more switching devices 122A-122N and over one or more quantum lines 118A-118N) the generated set of time-bin qubits to a plurality of time-bin qubit decoders 116A-116N communicatively coupled to a plurality of session authentication system server devices 104A-104N. In some embodiments, the one or more quantum lines 124 may comprise one or more non-polarization maintaining optical fibers to introduce additional error (e.g., to scramble the qubits transmitted through the fiber). In response, each of the plurality of time-bin qubit decoders 116A-116N may use their own MZI to measure the received time-bin qubits, generate a measured set of time-bin qubits, and transmit the measured set of time-bin qubits to a respective one of the plurality of session authentication system server devices 104A-104N.

In some embodiments, the one or more session authentication system server devices 104A-104N may be located within a server farm. For example, session authentication system server device 104A and session authentication system server device 104B may be located within the walls of a building warehouse of a server farm or otherwise within a geographic footprint of the server farm. In some embodiments, the one or more time-bin qubit decoders 116A-116N may be located within the server farm. In some embodiments, the one or more time-bin qubit decoders 116A-116N may be located outside the server farm. For example, the one or more time-bin qubit decoders 116A-116N may be located outside the geographic footprint of the server farm. In some embodiments, the one or more time-bin qubit encoders 114A-114N may be located within the server farm. In some embodiments, the one or more time-bin qubit encoders 114A-114N may be located outside the server farm. For example, the one or more time-bin qubit encoders 114A-114N may be located outside the geographic footprint of the server farm.

In some embodiments, as shown in FIG. 1E, each time-bin qubit encoder 114A-114N may be communicatively coupled to one or more switching devices 122A-122N through one or more quantum lines 124A-124N. For example, time-bin qubit encoder 114A may be communicatively coupled to one or more switching devices 122A at least partially through quantum line 124A; time-bin qubit encoder 114B may be communicatively coupled to one or more switching devices 122B at least partially through quantum line 124B; and time-bin qubit encoder 114N may be communicatively coupled to one or more switching devices 122N at least partially through quantum line 124N. In some embodiments, each switching device 122A-122N may be communicatively coupled to one or more time-bin qubit decoders 116A-116N through one or more quantum lines 118A-118N. For example, one or more switching devices 122A may be communicatively coupled to time-bin qubit decoder 116A at least partially through quantum line 118A; one or more switching devices 122A may be communicatively coupled to time-bin qubit decoder 116B at least partially through quantum line 118B; and one or more switching devices 122A may be communicatively coupled to time-bin qubit decoder 116N at least partially through quantum line 118N.

In some embodiments, the time-bin qubit encoder 114A may be configured to transmit a set of time-bin qubits to the one or more switching devices 122A over one or more quantum lines 124A. The one or more switching devices 122A may in turn be further configured to transmit the set of time-bin qubits to a corresponding time-bin qubit decoder 116A-116N over a corresponding quantum line 118A-118N. In some such embodiments, the time-bin qubit encoder 114A may be configured to not transmit any electronic information indicative of the first optical path length. For example, the time-bin qubit encoder 114A may be without network connection capability and incapable of communicating with a communications network (e.g., one or more communications networks 108) or even with other components within the session authentication system 102. When foregoing network connection capability in this fashion, a time-bin qubit encoder 114A is incapable of transmitting electronic information indicative of the optical path length used to generate time-bin qubits, and communications security is, in some instances, improved because a perpetrator may not be able to acquire that optical path length. In some embodiments, the first optical path length is not transmitted by the time-bin qubit encoder 114A.

The one or more switching devices 122 (e.g., 122A-122N) may be embodied by any suitable switching device, such as a polarization-maintaining (PM) switching device, an optical switching device, an electro-optical switching device, a microelectromechanical systems (MEMS) switching device, a PM fiber coupling, a splitter, or any other suitable device. In some instances, the one or more switching devices 122 may comprise one or more PM switches that are non-mechanical, operate with all optical fast-switching components with less than 0.5 dB of loss, and have been tested over millions of PM switches without a loss in a single polarization state. In some instances, the one or more switching devices 122 may comprise one or more all-optical PM switches that use polarization maintaining couplers and PM fibers to achieve very high speed modulation with no loss of polarization state. In some embodiments, each of the one or more switching devices 122 may be embodied by a plurality of cascading switching devices. For example, the one or more switching devices 122A may be embodied by three cascading switching devices. In some embodiments, polarization-maintaining fiber and switches may be used to ensure that the state of the photon is maintained and to provide for estimation of the level of randomness. In other embodiments, non-polarization maintaining fiber and switches may be used to ensure that the state of the photon is not maintained and to provide for an increased level of randomness.

In some embodiments, the one or more switching devices 122A may be configured to receive time-bin qubits from a time-bin qubit encoder 114A over one or more quantum lines 124A. In some embodiments, the one or more switching devices 122A may be configured to transmit subsets of received time-bin qubits to time-bin qubit decoders 116A-116N by switching between quantum lines 118A-118N. In some embodiments, the one or more switching devices 122A may be configured to switch between quantum lines 118A-118N at a frequency greater than one megahertz (MHz). In some embodiments, the one or more switching devices 122A may be configured to switch between quantum lines 118A-118N at a frequency greater than one megahertz (MHz). In these embodiments, the session authentication system 102 may be configured to authenticate over 100,000 sessions at the same time (or at nearly the same time).

In some embodiments, the one or more time-bin qubit decoders 116A-116N are communicatively coupled to the time-bin qubit encoder 114A via a combination including quantum line 124A, switching device 122A, and a corresponding one of quantum lines 118A-118N. The one or more time-bin qubit decoders 116A-116N are configured to receive a set of time-bin qubits from the time-bin qubit encoder 114A via the quantum line 124A, the switching device 122A, and the corresponding quantum lines 118A-118N. In some embodiments, the first optical path length used by the time-bin qubit encoder 114A to generate the set of time-bin qubits is not received by the one or more time-bin qubit decoders 116A-116N.

In one illustrative example, the time-bin qubit encoder 114A may be configured to generate a set of time-bin qubits using a first MZI comprising a first optical path length and transmit the generated set of time-bin qubits to the time-bin qubit decoder 116A and the time-bin qubit decoder 116B. The time-bin qubit decoder 116A may receive the set of time-bin qubits and measure the received time-bin qubits using a second MZI comprising a second optical path length different from the first optical path length to generate a first measured set of time-bin qubits. The time-bin qubit decoder 116B also may receive the set of time-bin qubits and measure the received time-bin qubits using a third MZI comprising a third optical path length different from the first optical path length to generate a third measured set of time-bin qubits, which may be different from the second measured set of time-bin qubits due to quantum uncertainty and the indeterminacy of quantum states.

In one illustrative example, a time-bin qubit encoder 114A may be configured to generate, based on a first optical path length of a first MZI, a set of time-bin qubits comprising a first subset of time-bin qubits and a second subset of time-bin qubits, and transmit the set of time-bin qubits to switching device 122A over quantum line 124A. In some instances, the first optical path length is not transmitted by the time-bin qubit encoder 114A. The switching device 122A may be in communication with the time-bin qubit encoder 114A over the quantum line 124A and configured to receive the set of time-bin qubits from the time-bin qubit encoder 114A over the first quantum line 124A. The switching device 122A may be further configured to transmit the first subset of time-bin qubits to time-bin qubit decoder 116A over quantum line 118A, and transmit the second subset of time-bin qubits to time-bin qubit decoder 116B over quantum line 118B. The time-bin qubit decoder 116A may be in communication with the switching device 122A over the quantum line 118A and configured to: receive the first subset of time-bin qubits from the switching device 122A over the quantum line 118A; and measure, based on a second optical path length of a second MZI different from the first optical path length of the first MZI, the first subset of time-bin qubits to generate a first measured set of time-bin qubits, wherein the first measured set of time-bin qubits comprises a first plurality of wildcard time-bin qubits. The time-bin qubit decoder 116A may thereafter transmit the first measured set of time-bin qubits to a corresponding session authentication system server device 104A that is configured to generate a first number based on the first measured set of time-bin qubits and authenticate a first session based on the generated first number. The time-bin qubit decoder 116B may be in communication with the switching device 122A over the quantum line 118B and configured to: receive the second subset of time-bin qubits from the switching device 122A over the quantum line 118B; and measure, based on a third optical path length of a third MZI different from the first optical path length of the first MZI, the second subset of time-bin qubits to generate a second measured set of time-bin qubits. The third optical path length of the third MZI may be the same as, or different from, the second optical path length of the second MZI. The time-bin qubit decoder 116B may thereafter transmit the second measured set of time-bin qubits to a corresponding session authentication system server device 104B that is configured to generate a second number based on the second measured set of time-bin qubits and authenticate a second session based on the generated second number.

Each of the one or more session authentication system server devices 104A-104N may be configured to authenticate a session based on a generated number. In some embodiments, each of the one or more session authentication system server devices 104A-104N may be configured to generate a session key based on the generated number. In some embodiments, the one or more session authentication system server devices 104A-104N may be configured to generate a seed for pseudo-random number generation based on the generated number, and generate a pseudo-random number based on the seed, wherein generation of the session key is based on the pseudo-random number. In some instances, the generated number is the session key.

In some embodiments, each of the one or more session authentication system server devices 104A-104N may be communicatively coupled to a plurality of client devices. For example, session authentication system server device 104A may be communicatively coupled to a first set of client devices comprising client device 110A, client device 110B, and client device 110N; session authentication system server device 104B may be communicatively coupled to a second set of client devices; and session authentication system server device 104N may be communicatively coupled to a third set of client devices.

In some embodiments, the one or more session authentication system server devices 104A-104N may use a generated session key to authenticate a session between the one or more session authentication system server devices 104A-104N and one or more client devices 110A-110N. For example, session authentication system server device 104A may generate a first session key to authenticate a session between session authentication system server device 104A and one of client devices 110, and session authentication system server device 104B may generate a second session key to authenticate a session between session authentication system server device 104B and another of client devices 110. In another example, a single session authentication system server device 104A may generate a first session key to authenticate a session between session authentication system server device 104A and client device 110A, and may also generate a second session key to authenticate a session between session authentication system server device 104A and client device 110B.

The one or more client devices 110A-110N may be embodied by any computing device known in the art. In some embodiments, the one or more client devices 110A-110N may comprise or be coupled to one or more laptop computers, smartphones, netbooks, tablet computers, wearable devices desktop computers, electronic workstations, kiosks, automated transaction machines (ATMs), or the like. The session authentication system 102 may receive information from, and transmit information to, the one or more client devices 110A-110N. For example, the session authentication system 102 may authenticate sessions between the one or more session authentication system server devices 104A-104N and the one or more client devices 110A-110N. It will be understood that in some embodiments, the client devices 110A-110N need not themselves be client devices, but may be peripheral devices communicatively coupled to client devices.

In one illustrative embodiment, a user may use client device 110 to log in to a website that utilizes one or more cookies. In response to client device 110 logging in to the website, session authentication system server device 104 may determine to create a session, generate a request for a random number, and transmit the request for the random number to the session authentication system 102. The session authentication system 102 may receive the request for the random number and initiate a process based on any of the various embodiments or combination of embodiments described herein that results in generation, by time-bin qubit decoder 116, of a measured set of time-bin qubits. The time-bin qubit decoder 116 may then transmit the measured set of time-bin qubits to the session authentication system server device 104. The session authentication system server device 104 may receive the measured set of time-bin qubits, generate a session key based on the measured set of time-bin qubits, and transmit (or, in some instances, perform a quantum key distribution process that includes transmitting) the session key to client device 110 for use in session authentication.

In some embodiments, the time-bin qubit encoder 114 and the time-bin qubit decoder 116 may be configured to respectively generate and measure various time-bin qubits of the set of time-bin qubits based on multiple optical path lengths, such as a first optical path length, a second optical path length different from the first optical path length, and in some embodiments, additional optical path lengths different from the first or the second optical path length. The difference in optical path length used for the generation and measurement of a particular time-bin qubit may thus manifest in several arrangements. For instance, a first optical path length used for generation of a time-bin qubit may be shorter or longer than a second optical path length used for measurement of the time-bin qubit.

The time-bin qubit decoder 116 is configured to transmit, to the session authentication system 102, the measured set of time-bin qubits generated by measuring the received set of time-bin qubits. This transmission may occur either via one or more communications networks 108 or via a non-network communication path (although in embodiments where the time-bin qubit decoder 116 comprises a component of the session authentication system 102, internal conveyance of the measured set of time-bin qubits may occur via an internal system bus (not shown for sake of brevity), or may not need to occur at all). The session authentication system 102 is configured to then generate a number based on the measured set of time-bin qubits (e.g., using all of the qubits in the measured set of time-bin qubits without discarding any of the qubits in the measured set of time-bin qubits). In some embodiments, the measured set of time-bin qubits may comprise an entirety of the generated number. But in other embodiments, the measured set of time-bin qubits may comprise a plurality of wildcard time-bin qubits comprising one or more error time-bin qubits, and the generated number may comprise a binary number comprising the one or more error time-bin qubits but not all of the other qubits in the measured set of time-bin qubits (e.g., the error time-bin qubits are not discarded but one or more "correctly" measured qubits are discarded). In some embodiments, either (i) the first optical path length is not transmitted by the time-bin qubit encoder 114 or (ii) the second optical path length is not transmitted by the time-bin qubit decoder 116. In some embodiments, the generated number cannot be reproduced without the first optical path length, the first set of time-bin qubits, and the second optical path length. But even with all of this information, the generated number cannot reliably be recreated due to the randomization introduced by the quantum effect triggered from use of divergent optical path lengths during encoding and decoding of the set of time-bin qubits. In some embodiments, the time-bin qubit decoder 116 may be configured to transmit electronic information indicative of the second optical path length to the time-bin qubit encoder 114, the session authentication system 102, or both. In some embodiments, the time-bin qubit decoder 116 may be configured to not transmit any electronic information indicative of the second optical path length to any other device.

In some embodiments, the session authentication system 102 may be configured to generate a session key based on the generated number. In some embodiments, the session authentication system 102 may be configured to generate a seed for pseudo-random number generation based on the generated number, and generate a pseudo-random number based on the seed, wherein generation of the session key is based on the pseudo-random number. In some instances, the generated number is the session key. The session authentication system 102 may use the generated session key to authenticate a session between a client device 110 and another device.

In some embodiments, the session authentication system 102 may be configured to generate a time-dependent quantum encoding schedule comprising a first plurality of optical path lengths respectively corresponding to a first plurality of time periods. The session authentication system 102 may be configured to transmit (e.g., directly, or indirectly through the central management device 112) the time-dependent quantum encoding schedule to the time-bin qubit encoder 114. The time-bin qubit encoder 114 may be configured to receive the time-dependent quantum encoding schedule and encode qubits based on the time-dependent quantum encoding schedule. For example, an example time-dependent quantum encoding schedule may comprise electronic information indicative of instructions to encode qubits based on a first optical path length during a first time period (e.g., a first 10 nanoseconds), a second optical path length during a second time period (e.g., the next 20 nanoseconds), a third optical path length during a third time period (e.g., the next 50 nanoseconds), and a fourth optical path length during a fourth time period (e.g., the next 20 nanoseconds), after which the time-dependent quantum encoding schedule may repeat.

In some embodiments, the session authentication system 102 may be configured to generate a time-dependent quantum decoding schedule comprising a second plurality of optical path lengths respectively corresponding to a second plurality of time periods. The session authentication system 102 may be configured to transmit (e.g., directly, or indirectly through the central management device 112) the time-dependent quantum decoding schedule to the time-bin qubit decoder 116. The time-bin qubit decoder 116 may be configured to receive the time-dependent quantum decoding schedule and measure qubits based on the time-dependent quantum decoding schedule. For example, an example time-dependent quantum decoding schedule may comprise electronic information indicative of instructions to measure time-bin qubits based on a first optical path length during a first time period (e.g., a first 5 nanoseconds), a second optical path length during a second time period (e.g., the next 30 nanoseconds), and third first optical path length during a third time period (e.g., the next 10 nanoseconds), after which the time-dependent quantum decoding schedule may repeat.

It will be appreciated that other patterns of optical path length selection may be utilized as well. For instance, the session authentication system 102 may be configured to generate a unit-dependent quantum encoding schedule, a unit-dependent quantum decoding schedule, or both. The session authentication system 102 may be configured to transmit (e.g., directly, or indirectly through the central management device 112) the unit-dependent quantum encoding schedule to the time-bin qubit encoder 114. The time-bin qubit encoder 114 may be configured to receive the unit-dependent quantum encoding schedule and generate time-bin qubits based on the unit-dependent quantum encoding schedule. The session authentication system 102 may be further configured to transmit (e.g., directly, or indirectly through the central management device 112) the unit-dependent quantum decoding schedule to the time-bin qubit decoder 116. The time-bin qubit decoder 116 may be configured to receive the unit-dependent quantum decoding schedule and measure time-bin qubits based on the unit-dependent quantum decoding schedule. For example, an example unit-dependent quantum encoding schedule may comprise electronic information indicative of instructions to encode time-bin qubits based on a first optical path length for a first number of time-bin qubits (e.g., a first 2 qubits), a second optical path length for a second number of time-bin qubits (e.g., the next 5 qubits), a third optical path length for a third number of time-bin qubits (e.g., the next 3 qubits), and a fourth optical path length during for a fourth number of time-bin qubits (e.g., the next 2 qubits), after which the unit-dependent quantum encoding schedule may repeat. As another example, an example unit-dependent quantum decoding schedule may comprise electronic information indicative of instructions to measure time-bin qubits based on a first optical path length for a first number of time-bin qubits (e.g., a first 2 qubits), a second optical path length for a second number of time-bin qubits (e.g., the next 4 qubits), and a third optical path length during for a third number of time-bin qubits (e.g., the next 2 qubits), after which the unit-dependent quantum decoding schedule may repeat. Other encoding and decoding patterns may be utilized as well without departing from the scope of the present disclosure.

It will further be appreciated that the optical path length or optical path lengths used by the time-bin qubit encoder 114 may be determined (by, for instance, either the time-bin qubit encoder 114 or the central management device 112) without reliance on the optical path length or optical path lengths used by the time-bin qubit decoder 116. Similarly, the optical path length or optical path lengths used by the time-bin qubit decoder 116 may be determined (by, for instance, either the time-bin qubit encoder 114 or the central management device 112) without reliance on the optical path length or optical path lengths used by the time-bin qubit encoder 114. One example where the determination of an optical path length or optical path lengths is performed without reliance on another optical path length or optical path lengths is when the optical path length or optical path lengths used by the time-bin qubit encoder 114 or time-bin qubit decoder 116 is or are determined without knowledge of the optical path length or optical path lengths used by the other of the time-bin qubit encoder 114 or the time-bin qubit decoder 116. After all, determination of a first optical path length without knowledge of a second optical path length necessarily means that the determination of the first optical path length occurs without reliance on the second optical path length.

However, lack of knowledge is not the only situation in which there can be non-reliance. Another situation in which there can be non-reliance is where the entity (e.g., the time-bin qubit encoder 114, the central management device 112, time-bin qubit decoder 116, or session authentication system 102) performing the determination of a first optical path length has knowledge of a second optical path length, but that knowledge is not used by the entity in the determination of the first optical path length. For example, the optical path length to be used by the time-bin qubit encoder 114 may be determined without reference to the corresponding optical path length used by the time-bin qubit decoder 116 even though the entity determining the optical path length to be used by the time-bin qubit encoder 114 has knowledge of the optical path length used by the time-bin qubit decoder 116. Similarly, the optical path length to be used by the time-bin qubit decoder 116 may be determined without reference to the corresponding optical path length used by the time-bin qubit encoder 114 even though the entity determining the optical path length or set of quantum to be used by the time-bin qubit decoder 116 may have knowledge of the optical path length used by the time-bin qubit encoder 114.

In some embodiments, there may be mutual non-reliance, such that the optical path length used by the time-bin qubit encoder 114 is determined without reliance on the optical path length used by the time-bin qubit decoder 116, and the optical path length used by the time-bin qubit decoder 116 is also determined without reliance on the optical path length used by the time-bin qubit encoder 114.

In some embodiments, the central management device 112 (which may, in some embodiments, be a component of the session authentication system 102) may determine an optical path length for use by the time-bin qubit encoder 114 using a pseudo-random optical path length selection technique, and both the central management device 112 and the time-bin qubit encoder 114 may never thereafter transmit information about the selected optical path length. In other embodiments, the time-bin qubit encoder 114 may itself select an optical path length for use and may utilize that selected optical path length without ever transmitting information about the selected optical path length to any other device. Similarly, the central management device 112 may determine an optical path for use by the time-bin qubit decoder 116 using a pseudo-random optical path length selection technique, and both the central management device 112 and the time-bin qubit decoder 116 may never thereafter transmit information about the selected optical path length.

By way of example, in some embodiments, the selection of an appropriate optical path length may utilize a frequency calculation procedure in which a selection frequency for each optical path length may be monitored such that the likelihood that an unselected optical path length is selected during subsequent selections is increased until an unselected optical path length is selected. Said differently, in an instance in which a first optical path length is initially selected, the remaining optical path lengths may be weighted such that selection of these optical path lengths on subsequent selection operations is more likely as compared to the first optical path length. Once these remaining optical path lengths are selected in the future, however, their corresponding weightings may decrease relative to still other unselected optical path lengths. To duplicate this pseudo-random optical path length selection technique, an intruder would need to have insight into multiple different iterations of the pseudo-random number generation process, and even then would need to deduce the weighting scheme. While a frequency calculation procedure is outlined above for selection of an optical path length for the time-bin qubit encoder 114 or the time-bin qubit decoder 116, the present disclosure contemplates that any known pseudo-random number generation algorithm (e.g., a middle-square method, mersenne twister, inversive congruential generator, lagged Fibonacci generator, linear feedback shift register or the like) may additionally or alternatively be used to pseudo-randomly select the optical path length for the time-bin qubit encoder 114, the time-bin qubit decoder 116, or both without departing from the scope of the disclosure.

Example Implementing Apparatus

The example environments described with reference to FIGS. 1A-1E may be embodied by one or more computing systems, such as: apparatus 200 shown in FIG. 2A, which represents an example session authentication system 102, a session authentication system server device 104, or both; apparatus 220 shown in FIG. 2B, which represents an example client device 110; apparatus 240 shown in FIG. 2C, which represents an example central management device 112; apparatus 260 shown in FIG. 2D, which represents an example time-bin qubit encoder 114; apparatus 270 shown in FIG. 2E, which represents an example switching device 122; and apparatus 280 shown in FIG. 2F, which represents an example time-bin qubit decoder 116. As noted previously, it will be appreciated that in some embodiments, one or more of the apparatuses described in connection with FIGS. 2A-2F may be components of another of these apparatuses (as one example, the apparatus 240, representing a central management device 112, may in some embodiments be a component of apparatus 200, which represents an example of the session authentication system 102; as another example, apparatus 260, which represents a time-bin qubit encoder 114, may in some embodiments be a component of apparatus 240, which represents the central management device 112; and as yet another example, apparatus 280, which represents a time-bin qubit decoder 116, may in some embodiments be a component of apparatus 200, which, as noted above, represents an example session authentication system 102).

Figure 2A:
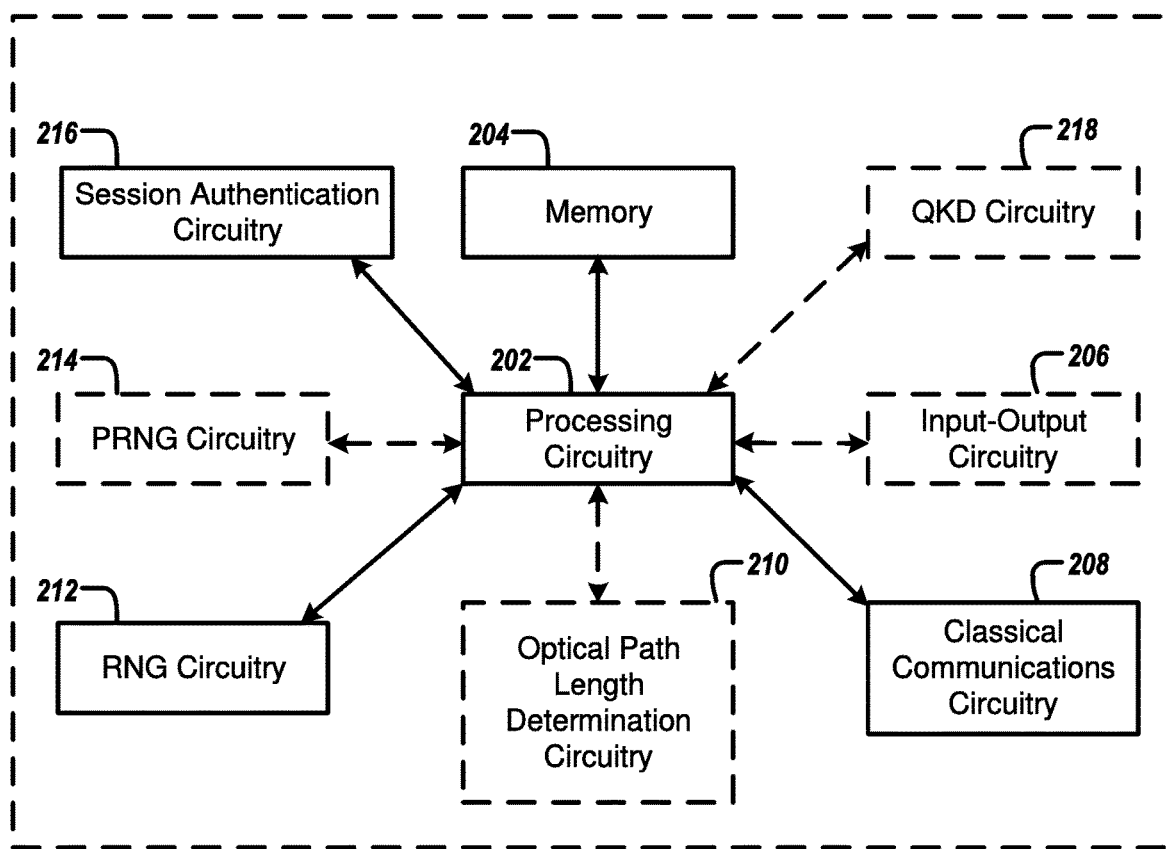
FIGS. 2A, 2B, 2C, 2D, 2E, and 2F illustrate schematic block diagrams of example circuitry that may perform various operations in accordance with some example embodiments described herein.

As illustrated in FIG. 2A, the apparatus 200, representing an example session authentication system 102 (or, in some instances, a session authentication system server device 104 resident within a session authentication system 102), may include processing circuitry 202, memory 204, input-output circuitry 206, classical communications circuitry 208, optical path length determination circuitry 210, random number generation (RNG) circuitry 212, pseudo-random number generation (PRNG) circuitry 214, session authentication circuitry 216, and quantum key distribution (QKD) circuitry 218. The apparatus 200 may be configured to execute various operations described above with respect to FIGS. 1A-1E and below with respect to FIGS. 3-5.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure. For example, the memory 204 may be configured to store data, control signals, electronic information, and, in some instances, encoding and decoding schedules. It will be understood that the memory 204 may be configured to store any electronic information, data, control signals, schedules, links, pointers, databases, tables, maps, embodiments, examples, figures, techniques, processes, operations, techniques, methods, systems, apparatuses, or computer program products described herein, or any combination thereof. The memory 204 may, in this regard, host components such as one or more session authentication system databases 106, described with reference to FIGS. 1A-1E.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the algorithms and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as MZI configuration data (e.g., optical path length, optical path difference), a control signal (e.g., a control signal indicative of an optical path length or a set of optical path lengths; a control signal indicative of an instruction to generate time-bin qubits or measure time-bin qubits according to a particular optical path length or set of optical path lengths), or a schedule (e.g., a time-dependent quantum encoding schedule, time-dependent quantum decoding schedule, a unit-dependent quantum encoding schedule, or a unit-dependent quantum decoding schedule) provided by a user. The input-output circuitry 206 may comprise a user interface and may include a display that may include a web user interface, a mobile application, a client device, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate electronic content for display by one or more other devices with which one or more users directly interact and classical communications circuitry 208 of the apparatus 200 may be leveraged to transmit the generated electronic content to one or more of those devices.

The classical communications circuitry 208 may be any device or circuitry embodied in either hardware or a combination of hardware and software that is configured to receive and/or transmit data from or to a network and/or any other device, circuitry, or module in communication with the apparatus 200. In this regard, the classical communications circuitry 208 may include, for example, a network interface for enabling communications with a wired or wireless communications network. For example, the classical communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 Through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The optical path length determination circuitry 210 includes hardware components designed or configured to determine, select, choose, or identify: a first optical path length or set of optical path lengths for encoding or generating time-bin qubits; a second optical path length or set of optical path lengths for decoding or measuring time-bin qubits; or both. In some embodiments, the optical path length determination circuitry 210 includes hardware components designed or configured to: determine the first optical path length without reliance on the second optical path length; determine the second optical path length without reliance on the first optical path length; or both. It will be understood that the terms "determine," "determining," and "determining," as recited throughout this disclosure, broadly and respectively encompass the terms generate, generating, and generation.

In some embodiments, the optical path length determination circuitry 210 includes hardware components designed or configured to generate: a first control signal indicative the determined first optical path length (or, in some instances, an instruction to generate time-bin qubits based on the determined first optical path length); a second control signal indicative the determined second optical path length (or, in some instances, an instruction to measure time-bin qubits based on the determined second optical path length); or both. In some embodiments, the optical path length determination circuitry 210 includes hardware components designed or configured to generate a third control signal indicative of an instruction to generate a set of time-bin qubits. In some embodiments, the first control signal may comprise one or more links or pointers to the determined first optical path length contained in a database of optical path lengths stored in memory (e.g., memory 204). In some embodiments, the second control signal may comprise one or more links or pointers to the determined second optical path length contained in the database of optical path lengths.

In some embodiments, the optical path length determination circuitry 210 includes hardware components designed or configured to generate: a time-dependent quantum encoding schedule comprising a first plurality of optical path lengths respectively corresponding to a first plurality of time periods; a time-dependent quantum decoding schedule comprising a second plurality of optical path lengths respectively corresponding to a second plurality of time periods; or both. In some embodiments, the optical path length determination circuitry 210 includes hardware components designed or configured to generate: a unit-dependent quantum encoding schedule comprising a first plurality of optical path lengths respectively corresponding to a first plurality of numbers of time-bin qubits; a unit-dependent quantum decoding schedule comprising a second plurality of optical path lengths respectively corresponding to a second plurality of numbers of time-bin qubits; or both. The optical path length may be determined by the optical path length determination circuitry 210 using a pseudo-random optical path length selection technique, as described previously. Subsequently, the optical path length determination circuitry 210 may never thereafter transmit information about any determined optical path length, except as necessary for instruction of corresponding time-bin qubit encoder 114 or time-bin qubit decoder 116.

In some embodiments, the optical path length determination circuitry 210 includes hardware components designed or configured to determine the first optical path length based on electronic information indicative of the second optical path length (e.g., electronic information indicative of the second optical path length received by classical communications circuitry 208 over a communications network from the time-bin qubit decoder 116). In some embodiments, the optical path length determination circuitry 210 includes hardware components designed or configured to determine the second optical path length based on the electronic information indicative of the first optical path length (e.g., electronic information indicative of the first optical path length received by classical communications circuitry 208 over a communications network from the time-bin qubit encoder 114). In some instances, the first optical path length and the second optical path length may be different. For example, the optical path difference between the first optical path length and the second optical path length may be a non-zero value. In some instances, the optical path difference between the first optical path length and the second optical path length may be less than a coherence length of a time-bin qubit. For example, the coherence length of a time-bin qubit may be around 100 meters, and the difference between the first optical path length and the second optical path length may be less than about 100 microns.

In some embodiments, the optical path length determination circuitry 210 includes hardware components designed or configured to generate a time-dependent quantum encoding schedule comprising a first plurality of optical path lengths respectively corresponding to a first plurality of time periods. In some instances, the first control signal may comprise the time-dependent quantum encoding schedule. In some embodiments, the optical path length determination circuitry 210 includes hardware components designed or configured to generate a time-dependent quantum decoding schedule comprising a second plurality of optical path lengths respectively corresponding to a second plurality of time periods. In some instances, the second control signal may comprise the time-dependent quantum decoding schedule. In some embodiments, the encoding circuitry 224 may be configured to generate the set of time-bin qubits based on the time-dependent quantum encoding schedule. In some embodiments, the decoding circuitry 226 may configured to measure the set of time-bin qubits based on the time-dependent quantum decoding schedule to generate the measured set of time-bin qubits.

In some embodiments, the optical path length determination circuitry 210 includes hardware components designed or configured to generate a unit-dependent quantum encoding schedule comprising a first plurality of optical path lengths respectively corresponding to a first plurality of numbers of time-bin qubits. In some instances, the first control signal may comprise the unit-dependent quantum encoding schedule. In some embodiments, the optical path length determination circuitry 210 includes hardware components designed or configured to generate a unit-dependent quantum decoding schedule comprising a second plurality of optical path lengths respectively corresponding to a second plurality of numbers of time-bin qubits. In some instances, the second control signal may comprise the unit-dependent quantum decoding schedule. In some embodiments, the encoding circuitry 224 may be configured to generate a set of time-bin qubits based on the unit-dependent quantum encoding schedule. In some embodiments, the decoding circuitry 226 may configured to measure the set of time-bin qubits based on the unit-dependent quantum decoding schedule to generate the measured set of time-bin qubits.

In some embodiments, the optical path length determination circuitry 210 includes hardware components designed or configured to determine the first optical path length using a pseudo-random optical path length selection technique. In some embodiments, the optical path length determination circuitry 210 includes hardware components designed or configured to determine the second optical path length using the pseudo-random optical path length selection technique. In some embodiments, the pseudo-random optical path length selection technique may comprise a frequency calculation procedure.

In some embodiments, the session authentication system 102 may comprise multiple optical path length determination circuitries 210, such as: one embodied by central management device 112; one embodied by each time-bin qubit encoder 114A-114N; one embodied by each time-bin qubit decoder 116A-116N; one that controls optical path length determination for time-bin qubit encoder 114 and another that controls optical path length determination for time-bin qubit decoders 116A-116N; or multiple optical path length determination circuitries corresponding to any other suitable arrangement.

The hardware components comprising the optical path length determination circuitry 210 may, for instance, utilize processing circuitry 202 to perform various computing operations and may utilize memory 204 for storage of data or electronic information received or generated by the optical path length determination circuitry 210. The hardware components may further utilize classical communications circuitry 208 or any other suitable wired or wireless communications path to communicate with a central management device 112, a time-bin qubit encoder 114, a time-bin qubit decoder 116, or any other suitable circuitry or device described herein.

The RNG circuitry 212 includes hardware components designed or configured to generate a number based on a measured set of time-bin qubits generated by a time-bin qubit decoder 116. For example, the generated number may be an actual second set of time-bin qubits generated by the time-bin qubit decoder 116, a number that includes the second set of time-bin qubits in its entirety, a number that includes only "error" qubits for which a optical path length used for encoding of a time-bin qubit differs from an optical path length used for decoding of the time-bin qubit, or any other suitable number. These hardware components may, for instance, utilize processing circuitry 202 to perform various computing operations and may utilize memory 204 for storage of data or electronic information received or generated by the RNG circuitry 212. The hardware components may further utilize classical communications circuitry 208, or any other suitable wired or wireless communications path to communicate with a time-bin qubit decoder 116 or any other suitable circuitry or device described herein.

The PRNG circuitry 214 includes hardware components designed or configured to receive a seed for pseudo-random number generation based on the number generated by the RNG circuitry 212 and then generate a pseudo-random number based on the seed. These hardware components may, for instance, utilize processing circuitry 202 to perform various computing operations and may utilize memory 204 for storage of data or electronic information received or generated by the PRNG circuitry 214.

The session authentication circuitry 216 includes hardware components designed or configured to generate a session ID (e.g., a session key) based on a number generated by the RNG circuitry 212, a pseudo-random number generated by the PRNG circuitry 214, or both. For example, the session authentication circuitry 216 may receive the pseudo-random number from the PRNG circuitry 214 and use the received pseudo-random number as the session key. In another example, the session authentication circuitry 216 may receive the generated number from the RNG circuitry 212 and use the generated number as the session key. In yet another example, the session authentication circuitry 216 may perform a further transformation on a number generated by the RNG circuitry 212 or a pseudo-random number generated by the PRNG circuitry 214 (e.g., a convolution of the number or pseudo-random number with an independent variable, such as an internal clock time measured by the apparatus 200), and thereafter use the result of the further transformation as the session key. In some embodiments, the session authentication circuitry 216 may be further configured to generate the session key by (i) setting the session key equal to a generated number (e.g., a number generated by the RNG circuitry 214 or the PRNG circuitry 216 based on the measured set of time-bin qubits), or (ii) using the generated number as a seed in a pseudo-random number generation procedure, wherein an output of the pseudo-random number generation procedure comprises the session key. Following generation of the session key, the session authentication circuitry 216 may transmit the session key to a client device 110 (and in one such embodiment, the session authentication circuitry 216 may cause QKD circuitry 218 to perform quantum key distribution of the session key to securely transmit the session key).

In some embodiments, the session authentication circuitry 216 includes hardware components designed or configured to subsequently authenticate a session between two or more devices. In some instances, the session authentication circuitry 216 may use the generated session key to authenticate a session on behalf of a server device (e.g., a session authentication system server device 104) and at the request of a client device 110. For example, the session authentication circuitry 216 may use a generated first session key to authenticate a first session on behalf of a session authentication system server device 104A and at the request of one of client devices 110A-110N. In another example, the session authentication circuitry 216 may use a generated second session key to authenticate a second session between two other devices, such as session authentication system server device 104B and at the request of another of the client devices 110A-110N. In some instances, the session authentication circuitry 216 may receive a key from the client device 110, and then compare the received key to the generated session key to determine if a match is found. If so, the session authentication circuitry 216 may transmit a communication to the server device comprising a validation of the session key received from the client device 110. If not, then the session authentication circuitry 216 may transmit a communication to the server device indicating a validation failure. The hardware components comprising the session authentication circuitry 216 may, for instance, utilize processing circuitry 202 to perform various computing operations and may utilize memory 204 for storage of data or electronic information received or generated by the session authentication circuitry 216. The hardware components may further utilize classical communications circuitry 208, or any other suitable wired or wireless communications path to communicate with a remote server device or a client device 110, or any other suitable circuitry or device described herein.

The QKD circuitry 218 includes hardware components designed or configured to perform quantum key distribution of a session key generated by the session authentication circuitry 216. These hardware components may, for instance, utilize processing circuitry 202 to perform various computing operations and may utilize memory 204 for storage of data or electronic information received or generated by the QKD circuitry 218. The hardware components may further utilize classical communications circuitry 208, or any other suitable wired or wireless communications path to communicate with a client device 110 to distribute a session ID to the client device 110, or with any other suitable circuitry or device described herein.

Figure 2B:
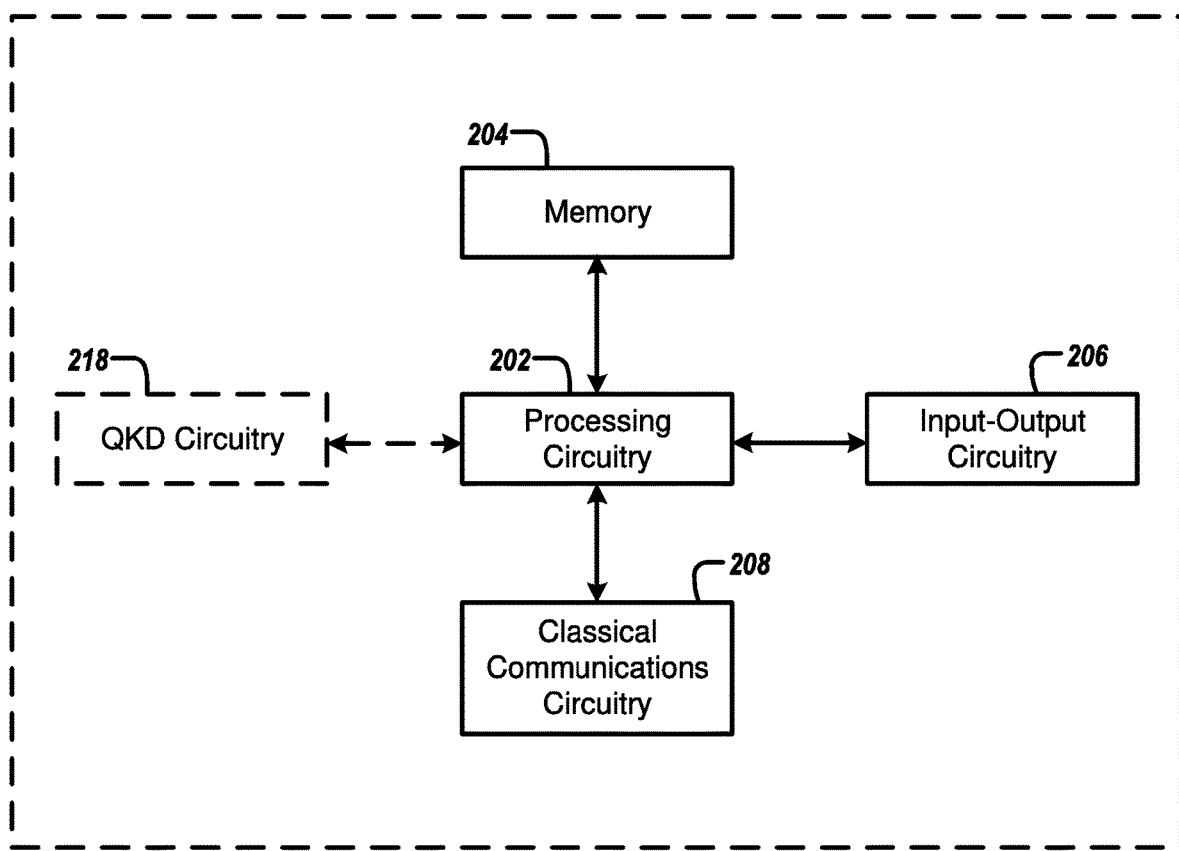

As illustrated in FIG. 2B, an apparatus 220 is shown that represents an example client device 110. The apparatus 220 includes processing circuitry 202, memory 204, input-output circuitry 206, and classical communications circuitry 208, and may optionally include QKD circuitry 218, as described above in connection with FIG. 2A. It will be appreciated that QKD circuitry 218 is an optional component of the apparatus 220 insofar as it is only required if a session ID (e.g., session key) is distributed from the session authentication system 102 to the client device 110 via a QKD procedure (other key distribution techniques may alternatively be used). It will be understood, however, that additional components providing additional functionality may be included in the apparatus 220 without departing from the scope of the present disclosure. The apparatus 220 may be involved in execution of various operations described above with respect to FIGS. 1A-1E and below with respect to FIGS. 3-5.

Figure 2C:
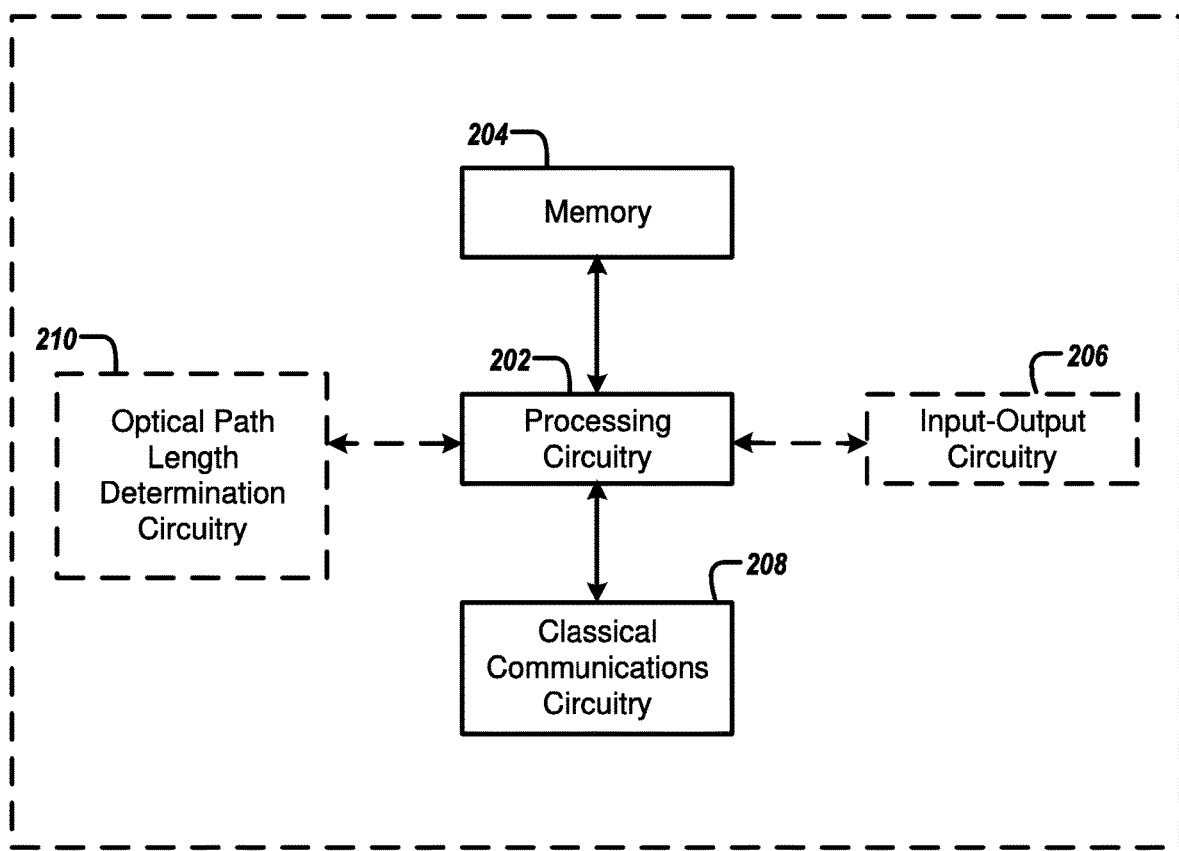

As illustrated in FIG. 2C, an apparatus 240 is shown that represents an example central management device 112. The apparatus 240 includes processing circuitry 202, memory 204, and classical communications circuitry 208, and may optionally include input-output circuitry 206, as described above in connection with FIG. 2A. Input-output circuitry 206 is optional in apparatus 240 insofar as it is only required in embodiments where a user directly interacts with the apparatus 240 to provide information needed for optical path length determination for a time-bin qubit encoder 114 communicatively connected to the central management device 112. To this end, the apparatus 240 may also include optical path length determination circuitry 210, as described above in connection with FIG. 2A, for the purpose of selecting an appropriate optical path length for the time-bin qubit encoder 114.

The apparatus 240 may be configured to execute various operations described above with respect to FIGS. 1A-1E and below with respect to FIGS. 3-5. It will be understood, however, that additional components providing additional functionality may be included in the apparatus 240 without departing from the scope of the present disclosure. Moreover, as noted previously, in some embodiments the central management device 112 comprises a component of session authentication system 102, and in such embodiments, the components described herein in connection with apparatus 240 shall be understood as comprising components of an apparatus 200 representing a corresponding session authentication system 102 (or a constituent session authentication system server device 104 thereof).

Figure 2D:
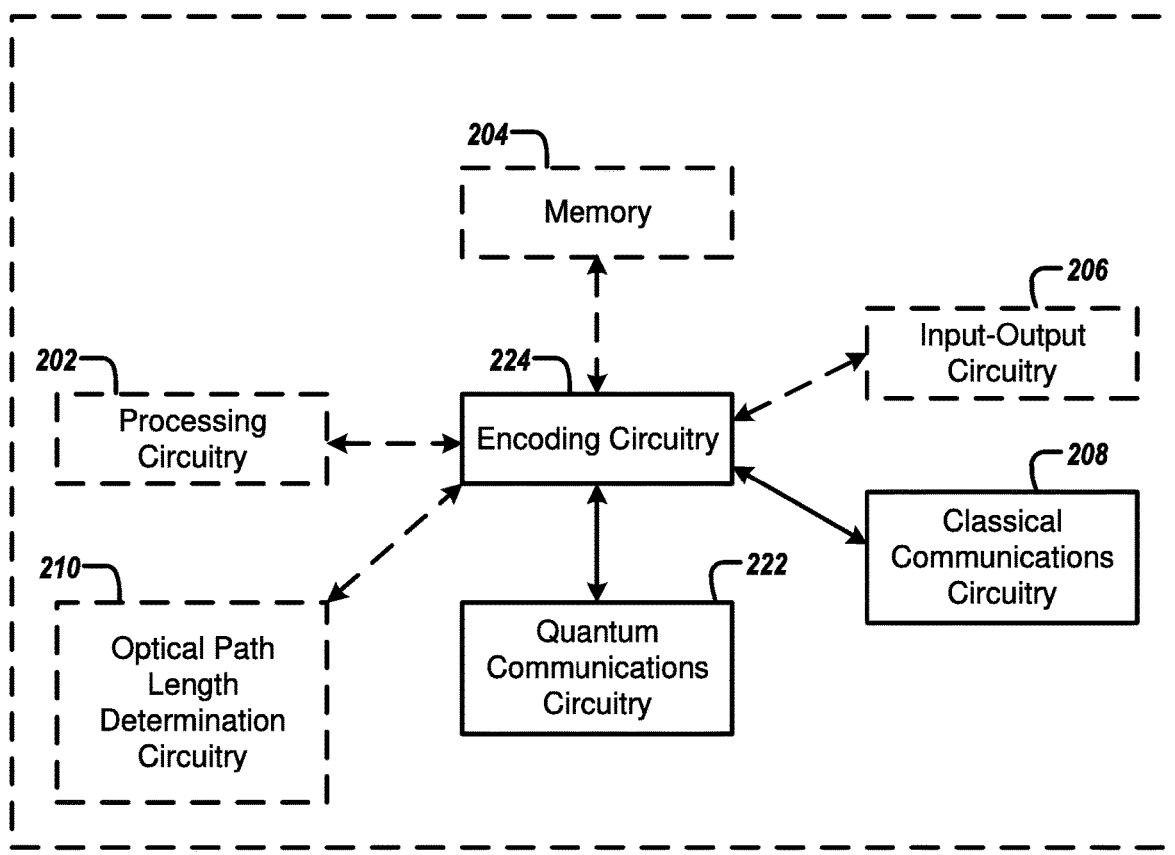

As illustrated in FIG. 2D, an apparatus 260 is shown that represents an example time-bin qubit encoder 114. The apparatus 260 includes classical communications circuitry 208, as described above in connection with FIG. 2A. The apparatus 260 additionally includes quantum communications circuitry 222 to transmit a set of time-bin qubits to a time-bin qubit decoder 116, and encoding circuitry 224 to generate the set of time-bin qubits to be transmitted. In addition, the apparatus 260 may further include processing circuitry 202 and a memory 204 to facilitate operation of encoding circuitry 224.

The quantum communications circuitry 222 may be any device or circuitry embodied in either hardware or a combination of hardware and software that is configured to receive and/or transmit photons from or to any other device, circuitry, or module in communication with the apparatus 260. In this regard, the quantum communications circuitry 222 may include, for example, an optical communications interface for enabling optical communications over an quantum line (e.g., quantum line 118 shown in FIGS. 1A-1E).

The encoding circuitry 224 includes hardware components designed or configured to generate a set of time-bin qubits and transmit, directly or indirectly, the set of time-bin qubits to the decoding circuitry 226. The encoding circuitry 224 may comprise various optoelectronic components, such as those described previously (including, but not limited to an MZI, a light source, a cloud-based light source, a single photon source, a laser, a modulating circuit, an attenuator, a deflector, or a combination thereof). In some embodiments, the encoding circuitry 224 may include additional hardware components designed or configured to generate time-bin qubits based on a time-dependent photon generation schedule. Similarly, the encoding circuitry 224 may include additional hardware components designed or configured to generate time-bin qubits based on a unit-dependent photon generation schedule. These hardware components may, for instance, comprise processing circuitry 202 to perform various computing operations and a memory 204 for storage of data or electronic information received or generated by the encoding circuitry 224. The hardware components may further utilize classical communications circuitry 208 to communicate with a server device (e.g., a central management device 112 or session authentication system server device 104), or any other suitable circuitry or device described herein.

In some embodiments, the encoding circuitry 224 may include hardware components designed or configured to generate the set of time-bin qubits based on a first optical path length and transmit, directly or indirectly, the set of time-bin qubits to the decoding circuitry 226. In some embodiments, the set of optical path lengths determined by the optical path length determination circuitry 210 may comprise a second optical path length different from the first optical path length. In some embodiments, the optical path difference between the first optical path length (e.g., corresponding to a first MZI comprised by the encoding circuitry 224) and the second optical path length (e.g., corresponding to a second MZI comprised by the decoding circuitry 226) may be non-zero value.

In some embodiments, the encoding circuitry 224 may include additional or alternate hardware components designed or configured to generate the set of time-bin qubits. For example, the encoding circuitry 224 may comprise a laser configured to generate light; an attenuator or deflector optically coupled to the laser and configured to transform the generated light into a series of photons; and an MZI optically coupled to the attenuator or deflector and configured to transform the generated series of photons into the set of time-bin qubits. In another example, the encoding circuitry 224 may comprise a single photon source configured to generate a series of photons; and an MZI optically coupled to the single photon source and configured to transform the generated series of photons into the set of time-bin qubits. In yet another example, the encoding circuitry 224 may comprise a modulating circuit configured to generate the set of time-bin qubits.

In some embodiments, the encoding circuitry 224 may include additional hardware components designed or configured to generate a set of time-bin qubits based on a time-dependent quantum encoding schedule comprising a first plurality of optical path length respectively corresponding to a first plurality of time periods. Similarly, the encoding circuitry 224 may include additional hardware components designed or configured to generate a set of time-bin qubits based on a unit-dependent quantum encoding schedule comprising a first plurality of optical path length respectively corresponding to a first plurality of numbers of qubits to be encoded.

The apparatus 260 may be configured to execute various operations described above with respect to FIGS. 1A-1E and below with respect to FIGS. 3-5. It will be understood, however, that additional components providing additional functionality may be included in the apparatus 260 without departing from the scope of the present disclosure. Moreover, as noted previously, in some embodiments the time-bin qubit encoder 114 comprises a component of a central management device 112, and in such embodiments, the components described herein in connection with apparatus 260 shall be understood as comprising components of an apparatus 240 representing a corresponding central management device 112 (or, by extension, of a session authentication system 102 (or a constituent session authentication system server device 104 thereof) in embodiments in which the central management device 112 itself comprises a component of one of those devices).

Figure 2E:
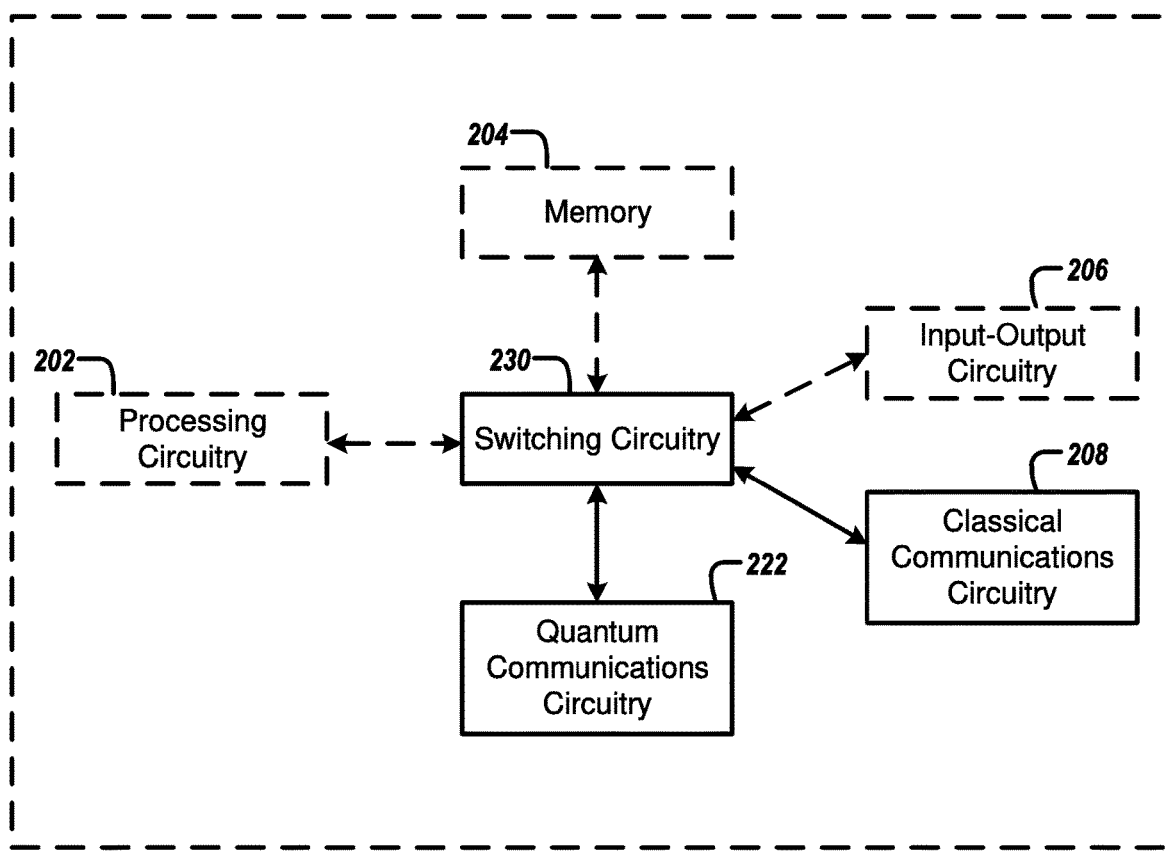

As illustrated in FIG. 2E, an apparatus 270 is shown that represents an example switching device 122. The apparatus 270 includes classical communications circuitry 208, as described above in connection with FIG. 2A. The apparatus 260 additionally includes quantum communications circuitry 222 to receive sets of time-bin qubits from a time-bin qubit encoder (or, in some instances, from another switching device) and to transmit sets or subsets of time-bin qubits to time-bin qubit decoders (or, in some instances, to another switching device). The apparatus 260 additionally includes switching circuitry 230 to perform the switching operations described herein. In addition, the apparatus 270 may further include processing circuitry 202 and a memory 204 to facilitate operation of switching circuitry 230.

The switching circuitry 230 includes hardware components designed or configured to transmit time-bin qubits received from the encoding circuitry 224 (e.g., a time-bin qubit encoder 114), or from another switching circuitry (e.g., one or more additional switching devices 122), to one or more decoding circuitries 226 (e.g., one or more of time-bin qubit decoders 116A-116N). For example, the switching circuitry 230 may transmit a first subset of time-bin qubits received from the encoding circuitry 224 to a first decoding circuitry 226 (e.g., time-bin qubit decoder 116A). In another example, the switching circuitry 230 may transmit the second subset of time-bin qubits received from the encoding circuitry 224 to a second decoding circuitry 226 (e.g., time-bin qubit decoder 116B). These hardware components may utilize quantum communications circuitry 222 to communicate with the encoding circuitry 224 (e.g., a time-bin qubit encoder 114), another switching circuitry (e.g., one or more additional switching devices 122), decoding circuitry 226 (e.g., one or more of time-bin qubit decoders 116A-116N), or any other suitable circuitry or device described herein.

Figure 2F:
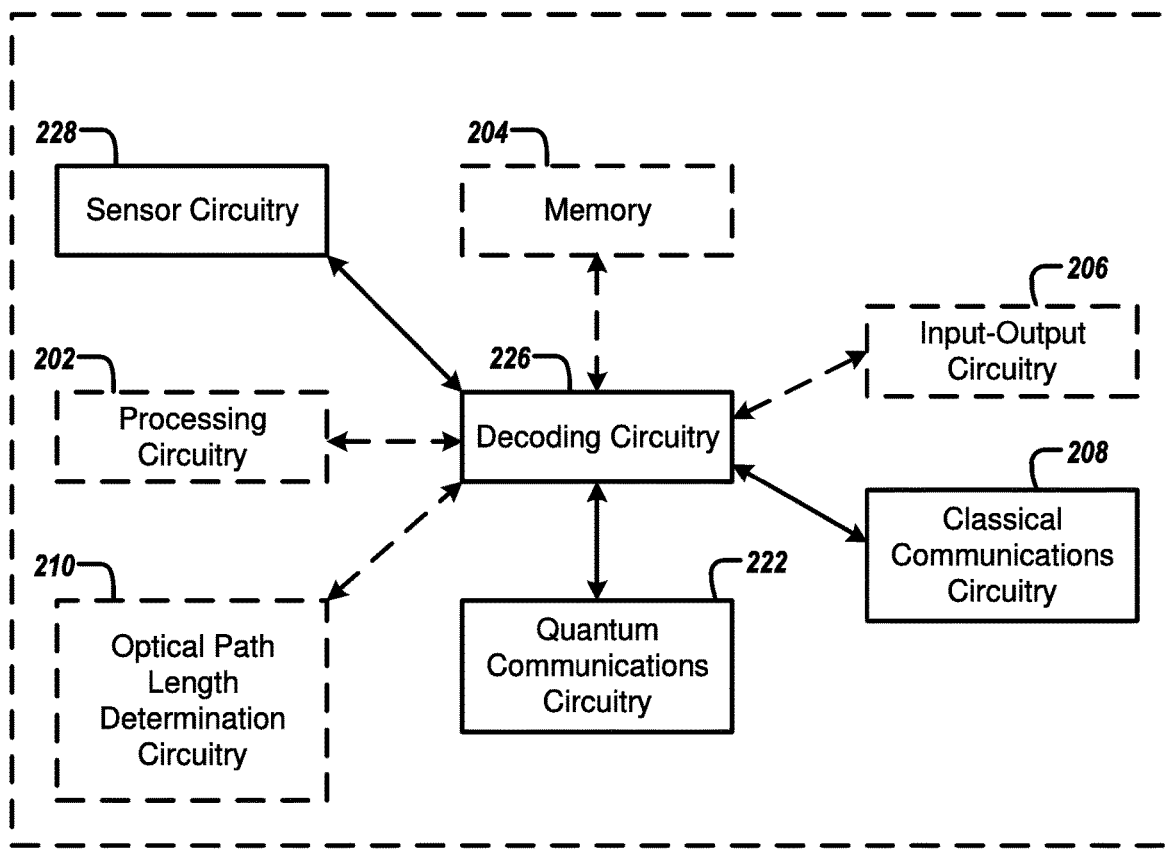

As illustrated in FIG. 2F, an apparatus 280 is shown that represents an example time-bin qubit decoder 116. The apparatus 280 includes classical communications circuitry 208 and quantum communications circuitry 222, as described above in connection with FIG. 2D, and additionally includes decoding circuitry 226 to measure a set of time-bin qubits received from a time-bin qubit encoder 114. Furthermore, in similar fashion as described above in connection with FIG. 2D, the apparatus 280 may further optionally include processing circuitry 202 and a memory 204 to facilitate operation of decoding circuitry 226, and may include optical path length determination circuitry 210 in some embodiments where the optical path length, or set of optical path lengths, selected for decoding of a given set of time-bin qubits is determined by the apparatus 280 and not by a separate session authentication system 102.

The decoding circuitry 226 includes hardware components designed or configured to generate a set of time-bin qubits by measuring the set of time-bin qubits received from a time-bin qubit encoder 114 based on a determined set of optical path lengths. The decoding circuitry 226 may comprise various optoelectronic components, such as those described previously (including, but not limited to, an MZI; a bit manipulator circuit configured to convert the qubit measurement into a stream of classical bits). In some embodiments, the decoding circuitry 226 may use N optical path lengths for decoding the time-bin qubits, where N represents an integer greater than or equal to one. In some embodiments, the decoding circuitry 226 may be configured to not transmit electronic information indicative of the determined set of optical path lengths. In some embodiments, the decoding circuitry 226 includes hardware components designed or configured to receive a control signal indicative of an instruction to initiate measurement based on the set of optical path lengths and, in response to receiving the control signal, measure the set of time-bin qubits based on the set of optical path lengths.

In some embodiments, the decoding circuitry 226 includes hardware components designed or configured to determine a set of optical path lengths to use for measurement, receive a set of time-bin qubits, and measure the set of time-bin qubits based on the determined set of optical path lengths to generate a measured set of time-bin qubits. In some embodiments, the decoding circuitry 226 includes hardware components designed or configured to receive the set of time-bin qubits while they are not in a well-defined quantum state. In some embodiments, the set of time-bin qubits may comprise a series of non-polarized photons. A non-polarized photon may comprise, for example, a photon whose polarization has not been measured. In some embodiments, the decoding circuitry 226 includes hardware components designed or configured to receive the set of time-bin qubits over a non-polarization maintaining optical fiber.

In some embodiments, the decoding circuitry 226 may comprise a bit manipulator circuit. The decoding circuitry 226 may include hardware components designed or configured to measure the set of time-bin qubits by measuring a polarization of the set of time-bin qubits using the determined set of optical path lengths. The bit manipulator circuit includes hardware components designed or configured to convert the measured polarization of the set of time-bin qubits into the measured set of time-bin qubits.

In some embodiments, the decoding circuitry 226 may comprise an MZI. The decoding circuitry 226 may include hardware components designed or configured to control an optical path length of the MZI based on the determined set of optical path lengths; and measure, using the MZI, the set of time-bin qubits to generate the measured set of time-bin qubits. In some embodiments, the encoding circuitry 224 may comprise a first MZI comprising a first optical path length, and the decoding circuitry 226 may comprise a second MZI comprising a second optical path length different from the first optical path length, wherein the determined set of optical path lengths comprises the second optical path length.

In some embodiments, the decoding circuitry 226 may include additional hardware components designed or configured to measure time-bin qubits based on a time-dependent decoding schedule comprising a plurality of optical path lengths respectively corresponding to a plurality of time periods. As another example, in some embodiments, the decoding circuitry 226 may include additional hardware components designed or configured to measure time-bin qubits based on a unit-dependent decoding schedule comprising a plurality of optical path lengths respectively corresponding to a plurality of numbers of time-bin qubits to be measured. These hardware components comprising the decoding circuitry 226 may, for instance, comprise processing circuitry 202 to perform various computing operations and a memory 204 for storage of data or electronic information received or generated by the decoding circuitry 226. These hardware components may further comprise classical communications circuitry 208, quantum communications circuitry 222, or any suitable wired or wireless communications path to communicate with a server device (e.g., one or more session authentication system server devices 104) a time-bin qubit encoder 114, or any other suitable circuitry or device described herein. In some instances, the decoding circuitry 226 may measure the set of time-bin qubits by measuring the set of time-bin qubits using sensor circuitry 228.

The sensor circuitry 228 includes hardware components designed or configured to measure received time-bin qubits. For example, the sensor circuitry 228 may comprise one or more sensors such as photodetectors, photodiodes, cameras, or any other suitable devices or optoelectronic components. These hardware components may, for instance, utilize processing circuitry 202 to perform various computing operations and may utilize memory 204 for storage of data or electronic information received or generated by the sensor circuitry 228.

The apparatus 280 may be configured to execute various operations described above with respect to FIGS. 1A-1E and below with respect to FIG. 3-5. It will be understood, however, that additional components providing additional functionality may be included in the apparatus 280 without departing from the scope of the present disclosure. Moreover, as noted previously, in some embodiments the time-bin qubit decoder 116 comprises a component of a session authentication system 102, and in such embodiments, the components described herein in connection with apparatus 280 shall be understood as comprising components of an apparatus 200 representing a corresponding session authentication system 102 (or a constituent session authentication system server device 104 thereof).

In some embodiments, the optical path length determination circuitry 210, the encoding circuitry 224, the decoding circuitry 226, or a combination thereof may be configured to control an optical path length of an MZI, such as by increasing or decreasing the temperature, moving an optical component (such as a light source, mirror, beam-splitter, or photodetector), increasing or decreasing the refractive index of a portion of the optical path length, utilizing any other suitable technique for controlling the optical path length, or a combination thereof.

In one illustrative example, the determined set of optical path lengths may comprise one or more determined physical lengths for an optical path. The optical path length determination circuitry 210, the encoding circuitry 224, or both may be configured to control an optical path length of an MZI used to generate a set of time-bin qubits based on the set of optical path lengths by selecting one of the physical lengths in the determined set of optical path lengths and moving (e.g., using a servo motor and a servo motor controller) an optical component (e.g., light source, mirror, beam-splitter, photodetector) such that the physical length of the optical path is substantially equal to the selected physical length. The optical path length determination circuitry 210, the decoding circuitry 226, or both may be configured to control an optical path length of an MZI used to measure a received set of time-bin qubits based on the set of optical path lengths by selecting one of the physical lengths in the determined set of optical path lengths and moving (e.g., using a servo motor and a servo motor controller) an optical component (e.g., light source, mirror, beam-splitter, photodetector) such that the physical length of the optical path is substantially equal to the selected physical length.

In another illustrative example, the determined set of optical path lengths may comprise one or more determined temperatures for an optical path. The optical path length determination circuitry 210, the encoding circuitry 224, or both may be configured to control an optical path length of an MZI used to generate a set of time-bin qubits based on the set of optical path lengths by selecting one of the temperatures in the determined set of optical path lengths and heating or cooling (e.g., using a thermoelectric temperature controller, a heating element, a MEMS heater) the optical path (or a component in thermal communication with the optical path) such that the temperature of the optical path is substantially equal to the selected temperature. The optical path length determination circuitry 210, the decoding circuitry 226, or both may be configured to control an optical path length of an MZI used to measure a received set of time-bin qubits based on the set of optical path lengths by selecting one of the temperatures in the determined set of optical path lengths and heating or cooling (e.g., using a thermoelectric temperature controller, a heating element, a MEMS heater) the optical path (or a component in thermal communication with the optical path) such that the temperature of the optical path is substantially equal to the selected temperature.

In yet another illustrative example, the determined set of optical path lengths may comprise one or more determined media or optical components (e.g., phase shifters, lenses, non-linear crystals, polarizers, wave plates, and other suitable media) for an optical path. The optical path length determination circuitry 210, the encoding circuitry 224, or both may be configured to control an optical path length of an MZI used to generate a set of time-bin qubits based on the set of optical path lengths by selecting one of the media or optical components in the determined set of optical path lengths and inserting or removing (e.g., using a servo motor and a servo motor controller) the selected medium or optical component into or out of the optical path. The optical path length determination circuitry 210, the decoding circuitry 226, or both may be configured to control an optical path length of an MZI used to measure a received set of time-bin qubits based on the set of optical path lengths by selecting one of the media or optical components in the determined set of optical path lengths and inserting or removing (e.g., using a servo motor and a servo motor controller) the selected medium or optical component into or out of the optical path.

In some embodiments, the optical path length determination circuitry 210, the encoding circuitry 224, the decoding circuitry 226, or a combination thereof may be configured to control an optical path length of an MZI by causing the optical path length to change over time based on a time-dependent encoding schedule, a time-dependent decoding schedule, or both. For example, the optical path length determination circuitry 210, the encoding circuitry 224, the decoding circuitry 226, or a combination thereof may be configured to control an optical path length of an MZI over time by moving (e.g., stepping, shaking, vibrating) an optical component between two or more positions defined by the time-dependent encoding schedule, the time-dependent decoding schedule, or both. In another example, the optical path length determination circuitry 210, the encoding circuitry 224, the decoding circuitry 226, or a combination thereof may be configured to control an optical path length of an MZI over time by changing (e.g., by applying a set of pulses to a resistive heating element or a thermoelectric device) the temperature of an optical path over time between two or more temperatures defined by the time-dependent encoding schedule, the time-dependent decoding schedule, or both. In yet another example, the optical path length determination circuitry 210, the encoding circuitry 224, the decoding circuitry 226, or a combination thereof may be configured to control an optical path length of an MZI over time by changing the media (e.g., by moving an optical component into and out of the optical path) of an optical path over time according to the time-dependent encoding schedule, the time-dependent decoding schedule, or both.

In some embodiments, the optical path length determination circuitry 210, the encoding circuitry 224, the decoding circuitry 226, or a combination thereof may be configured to control an optical path length of an MZI by causing the optical path length to change over a number (e.g., a predetermined number, a non-predetermined number) of time-bin qubits based on a unit-dependent encoding schedule, a unit-dependent decoding schedule, or both. For example, the optical path length determination circuitry 210, the encoding circuitry 224, the decoding circuitry 226, or a combination thereof may be configured to control an optical path length of an MZI over a number of time-bin qubits by moving (e.g., stepping, shaking, vibrating) an optical component between two or more positions every N-th time-bin qubit (where N represents an integer greater than or equal to one) defined by the unit-dependent encoding schedule, the unit-dependent decoding schedule, or both. In another example, the optical path length determination circuitry 210, the encoding circuitry 224, the decoding circuitry 226, or a combination thereof may be configured to control an optical path length of an MZI over a number of time-bin qubits by changing (e.g., by applying a set of pulses to a resistive heating element or a thermoelectric device) the temperature of an optical path every M-th time-bin qubit (where M represents an integer greater than or equal to one) between two or more temperatures defined by the unit-dependent encoding schedule, the unit-dependent decoding schedule, or both. In yet another example, the optical path length determination circuitry 210, the encoding circuitry 224, the decoding circuitry 226, or a combination thereof may be configured to control an optical path length of an MZI over time by changing the media (e.g., by moving an optical component into and out of the optical path) of an optical path every L-th time-bin qubit (where L represents an integer greater than or equal to one) according to the unit-dependent encoding schedule, the unit-dependent decoding schedule, or both.

Although some of these components of apparatuses 200, 220, 240, 260, 270, and 280 are described with respect to their functional capabilities, it should be understood that the particular implementations necessarily include the use of particular hardware to implement such functional capabilities. It should also be understood that certain of these components may include similar or common hardware. For example, two sets of circuitry may both leverage use of the same processor, network interface, quantum communications interface, optoelectronic components, storage medium, or the like to perform their associated functions, such that duplicate hardware is not required for each set of circuitry. It should also be appreciated that, in some embodiments, one or more of these components may include a separate processor, specially configured field programmable gate array (FPGA), application specific interface circuit (ASIC), or cloud utility to perform its corresponding functions as described herein.

The use of the term "circuitry" as used herein with respect to components of apparatuses 200, 220, 240, 260, 270, and 280 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, quantum communications interfaces, input-output devices, optoelectronic components, and other components. In some embodiments, other elements of apparatuses 200, 220, 240, 260, 270, and 280 may provide or supplement the functionality of particular circuitry. For example, the processing circuitry 202 may provide processing functionality, memory 204 may provide storage functionality, and classical communications circuitry 208 may provide network interface functionality, among other features.

In some embodiments, various components of one or more of the apparatuses 200, 220, 240, 260, or 280 may be hosted remotely (e.g., by one or more cloud servers) and thus need not physically reside on the corresponding apparatus 200, 220, 240, 260, or 280. Thus, some or all of the functionality described herein may be provided by third party circuitry. For example, a given apparatus 200, 220, 240, 260, or 280 may access one or more third party circuitries via any sort of networked connection that facilitates transmission of data and electronic information between the apparatus 200, 220, 240, 260, or 280 and the third party circuitries. In turn, that apparatus 200, 220, 240, 260, or 280 may be in remote communication with one or more of the other components describe above as comprising the apparatus 200, 220, 240, 260, or 280.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

FIG. 3 illustrates an example table 300 comprising example sets of time-bin qubits. As shown in FIG. 3, example table 300 includes a time-bin qubit encoder (e.g., time-bin qubit encoder 114) that generates a set of time-bin qubits ("11000110") using a first MZI (e.g., comprising a first optical path length). The time-bin qubit encoder transmits the generated set of time-bin qubits over a quantum line (e.g., quantum line 118) to a time-bin qubit decoder (e.g., time-bin qubit decoder 116) or, in some instances, a switching device (e.g., switching device 122). The time-bin qubit decoder receives the set of time-bin qubits from the time-bin qubit encoder (or, in some instances, from the switching device) and measures the received set of time-bin qubits using a second MZI (e.g., comprising a second optical path length different from the first optical path length) to generate a measured set of time-bin qubits. When the time-bin qubit decoder measures a time-bin qubit, the measured time-bin qubit is referred to herein as a "wildcard time-bin qubit" that has a first probability (e.g., a fifty percent chance) of being correct and a second probability (e.g., a fifty percent chance) of being incorrect based on quantum uncertainty and the indeterminacy of quantum states. In the example illustrated in FIG. 3, the time-bin qubit decoder generates a measured set of time-bin qubits ("10000010") that includes eight wildcard time-bin qubits (e.g., the first measured time-bin qubit "1"; the second measured time-bin qubit "0"; the third measured time-bin qubit "0"; the fourth measured time-bin qubit "0"; the fifth measured time-bin qubit "0"; the sixth measured time-bin qubit "0"; the seventh measured time-bin qubit "1"; and the eighth measured time-bin qubit "0") and two error time-bin qubits (e.g., the second measured time-bin qubit "0" and the sixth measured time-bin qubit "0").

It will be understood, however, that even if the time-bin qubit decoder were to store the received set of time-bin qubits and measure the received set of time-bin qubits a second time, the probability of decoding accuracy when using the second MZI will ensure that a new measured set of time-bin qubits may not be the same as the original measured set of time-bin qubits. For instance, the new measured set of time-bin qubits generated by the time-bin qubit decoder may correctly measure the second time-bin qubit, but may measure the sixth time-bin qubit in error. Accordingly, even if a perpetrator were to deduce the transmitted set of time-bin qubits ("11000110"), there is no way for that perpetrator to deduce the measured set of time-bin qubits ("10000010") from the original set of time-bin qubits. Thus, the session authentication system may use the measured set of time-bin qubits ("10000010") as a session ID or as the seed for a pseudo-random number generator that generates a session ID. Although an 8 time-bin qubit example is illustrated in FIG. 3, in some embodiments, a larger number of time-bin qubits may be utilized (e.g., 256 qubits, 1048 qubits). Regardless of the number of time-bin qubits used, a chance of error will remain for each qubit measured using the second MZI.

FIG. 4 illustrates an example table 400 comprising example sets of time-bin qubits. As shown in FIG. 4, example table 400 includes a time-bin qubit encoder (e.g., time-bin qubit encoder 114) that generates a set of time-bin qubits ("11000110") using a first MZI (e.g., comprising a first optical path length). The generated set of time bin qubits comprises a first subset of time-bin qubits (e.g., the first four time-bin qubits of the eight time-bin qubit sequence) and a second subset of time-bin qubits (e.g., the last four time-bin qubits of the eight time-bin qubit sequence). The time-bin qubit encoder transmits, via a switching device (e.g., switching device 122), the generated first subset of time-bin qubits to a first time-bin qubit decoder (e.g., time-bin qubit decoder 116A) and the generated second subset of time-bin qubits to a second time-bin qubit decoder (e.g., time-bin qubit decoder 116B). The first time-bin qubit decoder receives the first subset of time-bin qubits and measures the received first subset of time-bin qubits using a second MZI (e.g., comprising a second optical path length) to generate a first measured subset of time-bin qubits. When the first time-bin qubit decoder measures a time-bin qubit, the measured time-bin qubit is a wildcard time-bin qubit that has a first probability (e.g., a fifty percent chance) of being correct and a second probability (e.g., a fifty percent chance) of being incorrect based on quantum uncertainty and the indeterminacy of quantum states. In the example illustrated in FIG. 4, the first time-bin qubit decoder generates a first measured set of time-bin qubits ("1000") that includes four wildcard time-bin qubits (e.g., the first measured time-bin qubit "1"; the second measured time-bin qubit "0"; the third measured time-bin qubit "0"; and the fourth measured time-bin qubit "0") and one error time-bin qubit (e.g., the second measured time-bin qubit "0").

It will be understood, however, that even if the first subset of time-bin qubits were stored and measured a second time, the probability of decoding accuracy when using the second MZI will ensure that generating the first measured subset of time-bin qubits a second time may not produce the same outcome as generating the first measured subset of time-bin qubits the first time. For instance, the first time-bin qubit decoder may correctly measure the first, third, and fourth time-bin qubits, but may measure the second time-bin qubit in error. Accordingly, even if a perpetrator were to deduce the first transmitted subset of time-bin qubits ("1100"), there is no way for that perpetrator to deduce whether the first measured subset of time-bin qubits in this example is correct or contains error time-bin qubits in the second or the fourth time-bin qubit. In other words, the first measured subset of time-bin qubits could be "1100", "1101", "1000", or "1001," with equal probability. Thus, the first measured subset of time-bin qubits may be used as a session ID or may be used as the seed for a pseudo-random number generator that generates a session ID.

A similar fact holds true regarding the second measured subset of time-bin qubits. In the example illustrated in FIG. 4, the second time-bin qubit decoder receives the second subset of time-bin qubits and measures the received second subset of time-bin qubits using a third MZI (e.g., comprising a third optical path length) to generate a second measured subset of time-bin qubits. When the second time-bin qubit decoder measures a time-bin qubit, the measured time-bin qubit is a wildcard time-bin qubit that has a third probability (e.g., a fifty percent chance) of being correct and a fourth probability (e.g., a fifty percent chance) of being incorrect based on quantum uncertainty and the indeterminacy of quantum states. In the example illustrated in FIG. 4, the second time-bin qubit decoder generates a second measured subset of time-bin qubits ("0010") that comprises one error time-bin qubit (e.g., the second time-bin qubit "0").

It will be understood, however, that even if the second subset of time-bin qubits were stored and measured a second time, the probability of decoding accuracy when using the third MZI will ensure that generating the second measured subset of time-bin qubits a second time may not produce the same outcome as generating the second measured subset of time-bin qubits the first time. For instance, the second time-bin qubit decoder may correctly measure the first, third, and fourth time-bin qubits, but may measure the second time-bin qubit in error. Accordingly, even if a perpetrator were to deduce the second transmitted subset of time-bin qubits ("0110"), there is no way for that perpetrator to deduce whether the second measured subset of time-bin qubits in this example is correct or contains an error time-bin qubit in the second measured time-bin qubit. In other words, the second measured subset of time-bin qubits could be "0110", "0111", "0010", or "0011," with equal probability. Thus, the second measured subset of time-bin qubits may be used as a session ID or may be used as the seed for a pseudo-random number generator that generates a session ID.

In some embodiments which are not shown in FIG. 4 for the sake of brevity, each time-bin qubit decoder may receive a set of time-bin qubits and use alternative first, second, and third optical path lengths to measure the set of time-bin qubits. In this situation, the generated second set of time-bin qubits includes a higher likelihood of error. Still other sets of optical path lengths used for measuring received sets of time-bin qubits may be selected, as described previously. Accordingly, the amount of randomness introduced into the measured set of time-bin qubits may be increased by increasing the mismatch between the optical path lengths used for encoding and decoding of time-bin qubits.

Having described specific components of example devices and circuitries involved in various embodiments contemplated herein, example procedures for session authentication are described below in connection with FIG. 5.

Example Operations for Time-Bin Quantum Session Authentication

Figure 5:
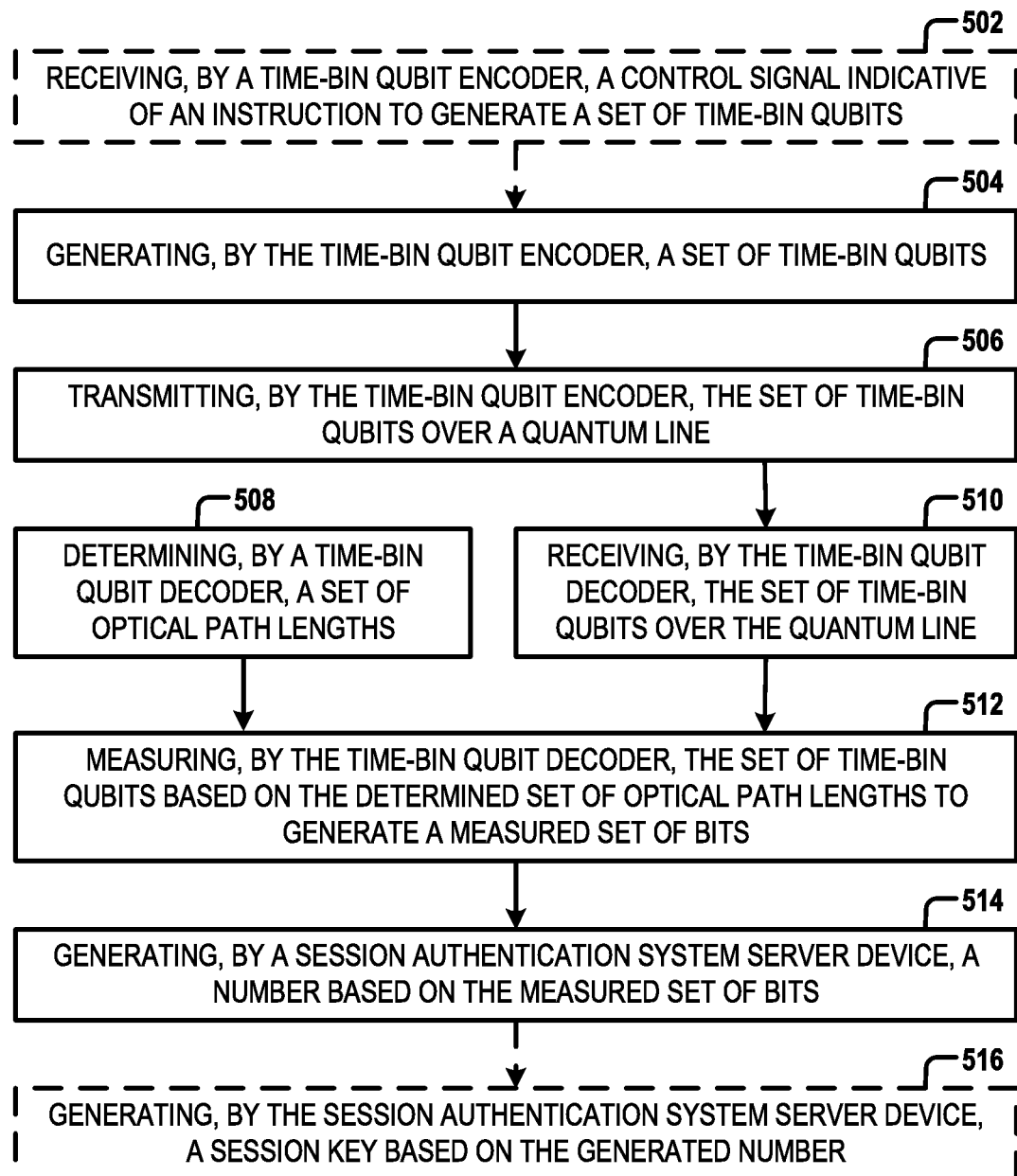
FIG. 5 illustrates an example flowchart for time-bin quantum session authentication in accordance with some example embodiments described herein.

Turning to FIG. 5, example flowchart 500 is illustrated that contains example operations for time-bin quantum session authentication according to example embodiments. The operations illustrated in FIG. 5 may, for example, be performed by one or more of the apparatuses shown in FIGS. 1A-1E, and described in FIGS. 2A-2F, such as: apparatus 200, which illustrates an example session authentication system 102 or, in some instances, an example session authentication system server device 104; apparatus 220, which illustrates an example client device 110; apparatus 240, which illustrates an example central management device 112; apparatus 260, which illustrates an example time-bin qubit encoder 114; apparatus 270, which illustrates an example switching device 122; or apparatus 280, which illustrates an example time-bin qubit decoder 116. Although the following operations are described as being performed by one or another of apparatuses 200, 220, 240, 260, 270, or 280, it will be understood that this manner of description is for ease of explanation and should not be interpreted as meaning that others of apparatuses 200, 220, 240, 260, 270, or 280 cannot perform such operations (such as in embodiments in which, for instance, one or more of these apparatuses comprise components of another of these apparatuses). The various operations described in connection with FIG. 5 may be performed by one of apparatuses 200, 220, 240, 260, 270, or 280, and by or through the use of one or more corresponding processing circuitry 202, memory 204, input-output circuitry 206, classical communications circuitry 208, optical path length determination circuitry 210, RNG circuitry 212, PRNG circuitry 214, session authentication circuitry 216, QKD circuitry 218, quantum communications circuitry 222, encoding circuitry 224, decoding circuitry 226, sensor circuitry 228, switching circuitry 230, any other suitable circuitry, or any combination thereof.

Optionally, as shown by optional operation 502, a first apparatus (e.g., apparatus 260) comprising a time-bin qubit encoder 114 includes means for receiving a control signal indicative of an instruction to generate a set of time-bin qubits. The means for generating the photonic control signal may be any suitable means, such as classical communications circuitry 208.

As shown by operation 504, the first apparatus (e.g., apparatus 260) comprising the time-bin qubit encoder 114 includes means for generating a set of time-bin qubits. The means for generating the set of time-bin qubits may be any suitable means, such as encoding circuitry 224. It will be understood that although a time-bin qubit encoder 114 generates a set of time-bin qubits, other devices illustrated in the environments of FIGS. 1A-1E may perform preliminary operations facilitating performance of operation 504. In some embodiments, the encoding circuitry 224 may be configured to generate the set of time-bin qubits in response to receipt of the control signal at optional operation 502.

As shown by operation 506, the first apparatus (e.g., apparatus 260) comprising the time-bin qubit encoder 114 includes means for transmitting the set of time-bin qubits over a quantum line (e.g., quantum line 118, quantum line 124) to a time-bin qubit decoder 116 or, in some instances, to a switching device 122. The means for transmitting the set of time-bin qubits may be any suitable means, such as quantum communications circuitry 222 described with reference to FIG. 2D. The quantum line may be any suitable quantum line, such as a non-polarization maintaining optical fiber.

As shown by operation 508, a second apparatus (e.g., apparatus 280) comprising a time-bin qubit decoder 116 includes means for determining a set of optical path lengths. In some instances, the determined set of optical path lengths may comprise a second optical path length. The second optical path length may be the same as, or different from, a first optical path length used to encode one or more time-bin qubits in the set of time-bin qubits generated at operation 504. The means for determining the set of optical path lengths may be any suitable means, such as optical path length determination circuitry 210. In some embodiments, either the time-bin qubit decoder 116 itself, the central management device 112, or a session authentication system 102 (in embodiments where the central management device 112 is a component thereof) may invoke optical path length determination circuitry 210 to determine the set of optical path lengths. In some embodiments, as noted previously, the optical path length determination circuitry 210 may utilize a pseudo-random optical path length selection technique for identifying one or more optical path lengths to utilize in the determined set of optical path lengths. Moreover, this pseudo-random optical path length selection technique may identify not just a set of optical path lengths to use, but may also identify one or another decoding schedule (e.g., a time-dependent decoding schedule or a unit-dependent decoding schedule, or another encoding schedule altogether)

governing when to use each optical path length in the set of optical path lengths for decoding of the set of time-bin qubits.

As shown by operation 510, the second apparatus (e.g., apparatus 280) comprising the time-bin qubit decoder 116 includes means for receiving the set of time-bin qubits over the quantum line (e.g., quantum line 118, quantum line 124) from the time-bin qubit encoder 114 or, in some instances, from the switching device 122. The means for receiving the set of time-bin qubits may be any suitable means, such as quantum communications circuitry 222.

As shown by operation 512, the second apparatus (e.g., apparatus 280) comprising the time-bin qubit decoder 116 includes means for decoding the set of time-bin qubits based on the determined set of optical path lengths to generate a measured set of time-bin qubits. The means for generating the measured set of time-bin qubits may be any suitable means, such as decoding circuitry 226 of apparatus 280, described with reference to FIG. 2F. In some embodiments, the decoding circuitry 226 may be configured to receive or retrieve the determined set of optical path lengths based on a control signal.

As shown by operation 514, a third apparatus (e.g., apparatus 200) comprising a session authentication system server device 104 includes means for generating a number based on the measured set of time-bin qubits. The means for generating the number may be any suitable means, such as RNG circuitry 212 described with reference to FIG. 2A. For instance, the measured set of time-bin qubits may be "10000010". In one example, the generated number may be the measured set of time-bin qubits "10000010". In another example, the generated number may be a number that includes the measured set of time-bin qubits in its entirety, such as "1000001000000000". It will be understood that in embodiments where the apparatus 200 comprises a distinct apparatus from apparatus 280, an intervening operation may take place in which the apparatus 280 comprises means, such as classical communications circuitry 208, for transmitting the measured set of time-bin qubits to the apparatus 200 (and the apparatus 200 includes corresponding classical communications circuitry 208 for receiving the measured set of time-bin qubits).

Optionally, as shown by optional operation 516, the third apparatus (e.g., apparatus 200) comprising a session authentication system server device 104 includes means for generating a session key based on the generated number. The means for generating the session key may be any suitable means, such as RNG circuitry 212, PRNG circuitry 214, session authentication circuitry 216, QKD circuitry 218, or a combination thereof. For example, the PRNG circuitry 214 may be configured to use the generated number as a seed for pseudo-random number generation, and to generate a pseudo-random number based on the seed, and then to transmit the pseudo-random number to the session authentication circuitry 216. The session authentication circuitry 216 may receive the pseudo-random number and generate the session key based on the pseudo-random number. In some instances, session authentication circuitry 216 may receive a number directly from RNG circuitry 212 and may generate the session key based directly on the generated number. In this regard, in some embodiments, the generated number may be the session key. In other instances, the pseudo-random number may be the session key. In still other instances, the session authentication circuitry 216 may perform a transformation on the pseudo-random number (e.g., convolution with another variable, such as time) to arrive at the session key. In some embodiments, the session authentication circuitry 216 may then transmit the generated session key to a client device 110 (e.g., via invoking QKD circuitry 218 to effect secure transmission of the session key), and may thereafter use the generated session key to authenticate a session between two devices, such as between the client device 110 and another device (e.g., a session authentication system server device 104 hosting a session accessed by the client device 110). Operation 518 is illustrated as optional insofar as the number generated in operation 516 may be used in theory for a variety of purposes, and not just within the context of session key generation.

It will be understood that although operations 514 and 516 are described above to illustrate practical applications of some example embodiments described herein, the number generated in operation 514 may in other embodiments be used for a variety of additional or alternative purposes (e.g., for gaming devices, statistics, cryptography, or the like) that may not necessarily fall within the context of session authentication.

In some embodiments, operations 502, 504, 506, 508, 510, 512, 514, and 516 may not necessarily occur in the order depicted in FIG. 5, and in some cases one or more of the operations depicted in FIG. 5 may occur substantially simultaneously, or additional steps may be involved before, after, or between any of the operations shown in FIG. 5.

As noted previously, there are many advantages of these and other embodiments described herein. In all cases, however, example embodiments of the present disclosure enhance the session authentication procedure by providing a session key that has truly random elements, which facilitate the generation of a session ID that cannot be reproduced by a third party.

FIG. 5 thus illustrates an example flowchart 500 describing the operation of various systems (e.g., session authentication system 102 described with reference to FIGS. 1A-1E), apparatuses (e.g., the apparatuses 200, 220, 240, 260, 270, and 280 described with reference to FIGS. 2A-2F), methods, and computer program products according to example embodiments contemplated herein. It will be understood that each operation of the flowchart, and combinations of operations in the flowchart, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200, 220, 240, 260, 270, or 280) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 5 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the supply management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for session authentication, the system comprising:
    decoding circuitry configured to
        receive a set of time-bin qubits generated based on a first optical path length,
        determine a set of optical path lengths to use for measurement, wherein the determined set of optical path lengths comprises a second optical path length, and
        measure, based on the determined set of optical path lengths, the set of time-bin qubits to generate a measured set of time-bin qubits; and
    session authentication circuitry configured to
        generate a session key based on the measured set of time-bin qubits.

2. The system of claim 1, wherein the second optical path length is different from the first optical path length.

3. The system of claim 2, wherein the first optical path length comprises a first physical length of a first optical path, wherein the second optical path length comprises a second physical length of a second optical path, and wherein the first physical length and the second physical length are different.

4. The system of claim 2, wherein the first optical path length comprises a first temperature of a first optical path, wherein the second optical path length comprises a second temperature of a second optical path, and wherein the first temperature and the second temperature are different.

5. The system of claim 2, wherein the first optical path length comprises a first portion of a first optical path comprising a first index of refraction, wherein the second optical path length comprises a second portion of a second optical path comprising a second index of refraction, and wherein the first index of refraction and the second index of refraction are different.

6. The system of claim 2, wherein a difference between the first optical path length and the second optical path length is less than a coherence length.

7. The system of claim 1,
    wherein the decoding circuitry comprises a bit manipulator circuit, wherein the decoding circuitry is configured to decode the set of time-bin qubits by measuring a polarization of each time-bin qubit in the set of time-bin qubits, and wherein the bit manipulator circuit is configured to convert the measured polarization of each time-bin qubit in the set of time-bin qubits into the measured set of time-bin qubits.

8. The system of claim 1, further comprising:

encoding circuitry configured to
generate the set of time-bin qubits based on a first optical path length, and
transmit the set of time-bin qubits to the decoding circuitry, wherein the determined set of optical path lengths comprises a second optical path length different from the first optical path length.

9. The system of claim 8, wherein the encoding circuitry comprises:

a laser configured to generate light;
an attenuator or deflector optically coupled to the laser and configured to transform the generated light into a series of photons; and
a Mach-Zehnder interferometer optically coupled to the attenuator or deflector and configured to transform the generated series of photons into the set of time-bin qubits.

10. The system of claim 8, wherein the encoding circuitry comprises:

a single photon source configured to generate a series of photons; and a Mach-Zehnder interferometer optically coupled to the single photon source and configured to transform the generated series of photons into the set of time-bin qubits.

11. The system of claim 8, wherein the encoding circuitry comprises a modulating circuit configured to generate the set of time-bin qubits.

12. The system of claim 1, wherein the set of optical path lengths comprises a time-dependent decoding schedule comprising a plurality of optical path lengths respectively corresponding to a plurality of time periods, wherein the set of optical path lengths comprises the plurality of optical path lengths.

13. The system of claim 1, wherein the set of optical path lengths comprises a unit-dependent decoding schedule comprising a plurality of optical path lengths respectively corresponding to a plurality of numbers of time-bin qubits to be measured, wherein the set of optical path lengths comprises the plurality of optical path lengths.

14. The system of claim 1, wherein the decoding circuitry comprises a Mach-Zehnder interferometer, and wherein the decoding circuitry is further configured to:

control an optical path length of the Mach-Zehnder interferometer based on the determined set of optical path lengths; and
measure, using the Mach-Zehnder interferometer, the set of time-bin qubits to generate the measured set of time-bin qubits.

15. The system of claim 1, wherein the encoding circuitry comprises a first Mach-Zehnder interferometer comprising a first optical path length, wherein the decoding circuitry comprises a second Mach-Zehnder interferometer comprising a second optical path length different from the first optical path length, and wherein the determined set of optical path lengths comprises the second optical path length.

16. The system of claim 1, wherein the decoding circuitry is further configured to:

receive a control signal indicative of an instruction to initiate measurement based on the set of optical path lengths; and
in response to receiving the control signal, measure the set of time-bin qubits based on the set of optical path lengths.

17. The system of claim 1, wherein a time-bin qubit decoder comprises the decoding circuitry, and wherein a separate session authentication system server device comprises the session authentication circuitry.

18. The system of claim 1, further comprising:

random number generation circuitry configured to generate a number based on the measured set of time-bin qubits,
wherein the session authentication circuitry is configured to generate the session key by
setting the session key equal to the generated number, or
using the generated number as a seed in a pseudo-random number generation procedure, wherein an output of the pseudo-random number generation procedure comprises the session key.

19. A method for session authentication, the method comprising:

determining, by decoding circuitry, a set of optical path lengths to use for measurement;
receiving, by the decoding circuitry, a set of time-bin qubits;
measuring, by the decoding circuitry and based on the determined set of optical path lengths, the set of time-bin qubits to generate a measured set of time-bin qubits; and
generating, by session authentication circuitry, a session key based on the measured set of time-bin qubits.

20. A computer program product for session authentication, the computer program product comprising at least one non-transitory computer-readable storage medium storing program instructions that, when executed, cause an apparatus to:

determine a set of optical path lengths to use for measurement;
receive a set of time-bin qubits;
measure, based on the determined set of optical path lengths, the set of time-bin qubits to generate a measured set of time-bin qubits; and
generate a session key based on the measured set of time-bin qubits.

* * * * *